(12) United States Patent
Sasaki et al.

(10) Patent No.: US 8,498,183 B1
(45) Date of Patent: Jul. 30, 2013

(54) THERMALLY-ASSISTED MAGNETIC RECORDING HEAD HAVING A WAVEGUIDE AND A RETURN PATH SECTION

(71) Applicants: Yoshitaka Sasaki, Santa Clara, CA (US); Hiroyuki Ito, Milpitas, CA (US); Kazuki Sato, Milpitas, CA (US); Hironori Araki, Milpitas, CA (US); Shigeki Tanemura, Milpitas, CA (US); Ryuji Fujii, Hong Kong (CN)

(72) Inventors: Yoshitaka Sasaki, Santa Clara, CA (US); Hiroyuki Ito, Milpitas, CA (US); Kazuki Sato, Milpitas, CA (US); Hironori Araki, Milpitas, CA (US); Shigeki Tanemura, Milpitas, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/660,479

(22) Filed: Oct. 25, 2012

(51) Int. Cl.
*G11B 11/00* (2006.01)

(52) U.S. Cl.
USPC .................................... 369/13.33; 369/13.13

(58) Field of Classification Search
USPC .......... 369/13.02, 13.13, 13.17, 13.32, 13.33, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 2001/0006436 A1* | 7/2001 | Akiyama et al. | 369/13.33 |
| 2001/0017820 A1* | 8/2001 | Akiyama et al. | 369/13.33 |
| 2010/0020431 A1* | 1/2010 | Shimazawa et al. | 369/13.33 |
| 2010/0172220 A1 | 7/2010 | Komura et al. | |
| 2012/0243127 A1* | 9/2012 | Iwasaki et al. | 369/13.33 |

FOREIGN PATENT DOCUMENTS

JP   A-2011-086361   4/2011

* cited by examiner

*Primary Examiner* — Tan X Dinh
(74) *Attorney, Agent, or Firm* — Oliff & Berridge, PLC

(57) ABSTRACT

A thermally-assisted magnetic recording head includes a coil, a main pole, a return path section, a waveguide, and a plasmon generator. The waveguide includes a core and a cladding. The return path section includes: first and second columnar portions located on opposite sides of the core in the track width direction; a coupling portion coupling the first and second columnar portions to each other; and a third columnar portion connected to the coupling portion. The third columnar portion is smaller than the coupling portion in width in the track width direction. The coil includes a winding portion wound around the third columnar portion.

5 Claims, 23 Drawing Sheets

THERMALLY-ASSISTED MAGNETIC RECORDING HEAD HAVING A WAVEGUIDE AND A RETURN PATH SECTION

BACKGROUND OF THE INVENTION

1. Field of the Invention

The present invention relates to a thermally-assisted magnetic recording head for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of a recording medium. The slider has a medium facing surface that faces the recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The plasmon generator has a near-field light generating part located in the medium facing surface. The laser light to be used for generating near-field light is typically guided through a waveguide, which is provided in the slider, to the plasmon generator disposed near the medium facing surface of the slider.

JP-A-2011-86361 discloses a thermally-assisted magnetic recording head configured to excite plasmons on a plasmon generator (a light emitting part) by directly irradiating the plasmon generator with laser light.

U.S. Patent Application Publication No. 2010/0172220 A1 discloses a thermally-assisted magnetic recording head in which a plasmon generator (a surface plasmon antenna) is arranged to face the outer surface of a waveguide (a core) with a predetermined spacing therebetween, so that light propagating through the waveguide is totally reflected at the outer surface of the waveguide to thereby generate evanescent light that is used to excite surface plasmons on the plasmon generator.

Thermally-assisted magnetic recording typically uses a main pole, a return path section, and a coil as means for producing a write magnetic field. The main pole and the return path section each have an end face located in the medium facing surface. The main pole produces a write magnetic field from its end face. The return path section is connected to the main pole so that a space through which part of the coil passes is defined by the main pole and the return path section. The coil produces a magnetic field corresponding to data to be written on a recording medium. The main pole and the return path section form a magnetic path for passing a magnetic flux corresponding to the magnetic field produced by the coil.

Now, consider a thermally-assisted magnetic recording head configured so that the near-field light generating part of the plasmon generator is interposed between the end face of the main pole and the end face of the return path section, and the core of the waveguide and the return path section intersect each other without contacting each other. JP-A-2011-86361 describes two methods for precluding the contact between the core and the return path section. The first method is to branch a portion of the core intersecting the return path section into two portions so as to detour around the return path section and then merge the two portions into one. The second method is to provide a portion of the return path section intersecting the core with a penetrating hole for passing the core therethrough. In other words, the second method is to branch the portion of the return path section intersecting the core into two portions so as to detour around the core and then merge the two portions into one.

To preclude the contact between the core and the return path section, the second method described above is typically used. In this case, the return path section includes a coupling portion for coupling the two branched portions. The coil is wound around the coupling portion.

In the above-described configuration, the width of the coupling portion in the track width direction is equal to or greater than the distance between the respective outer ends of the two branched portions in the track width direction, and is thus comparatively great. Since the coil is wound around the coupling portion, the entire length of the coil is long. As a result, the coil has a high resistance and thus has a high heating value. This causes components around the coil to expand, thus causing part of the medium facing surface to protrude toward a recording medium and become more likely to collide with the recording medium. In order to prevent this, the distance between the medium facing surface and the recording medium could be increased. However, this would lead to deterioration in write characteristics such as the overwrite property or to an increase in error rate.

On the other hand, in order to improve the write characteristics in a high frequency band, it is desirable to reduce the length of the magnetic path formed by the main pole and the return path section. To that end, it is effective to bring the portion of the return path section intersecting the core closer to the medium facing surface. Here, consider a case where the coil is wound around the coupling portion of the return path section. In this case, since the width of the coupling portion in the track width direction is comparatively great as mentioned above, the coil has at least one conductor portion that is located between the coupling portion and the medium facing surface and extends linearly in parallel to the medium facing surface (such a conductor portion will hereinafter be referred to as a linear conductor portion). If the portion of the return path section intersecting the core is brought closer to the medium facing surface, the linear conductor portion becomes narrow and long. This makes the coil higher in resistance, thus causing the above-described various problems to occur noticeably.

OBJECT AND SUMMARY OF THE INVENTION

It is an object of the present invention to provide a thermally-assisted magnetic recording head configured so that the core of a waveguide and a return path section intersect each other without contacting each other, the thermally-assisted magnetic recording head exhibiting excellent write characteristics in a high frequency band and being low in coil resistance.

A thermally-assisted magnetic recording head of the present invention includes: a medium facing surface that faces a recording medium; a coil that produces a magnetic field corresponding to data to be written on the recording medium; a main pole; a return path section; a waveguide; and a plasmon generator. The main pole has a first end face located in the medium facing surface. The main pole allows a magnetic flux corresponding to the magnetic field produced by the coil to pass, and produces a write magnetic field for writing data on the recording medium. The return path section is made of a magnetic material and has a second end face located in the medium facing surface. The return path section is connected to the main pole so that a space through which part of the coil passes is defined by the main pole and the return path section. The waveguide includes a core through which light propagates, and a cladding provided around the core. The plasmon generator has a near-field light generating part located in the medium facing surface.

The first end face and the second end face are located at positions that are different from each other in the direction of travel of the recording medium. The near-field light generating part is located between the first end face and the second end face. The plasmon generator is configured so that a surface plasmon is excited on the plasmon generator based on the light propagating through the core, and the near-field light generating part generates near-field light based on the surface plasmon.

The return path section includes: first and second columnar portions that are located on opposite sides of the core in the track width direction and are each spaced from the core; a coupling portion coupling the first and second columnar portions to each other; and a third columnar portion connected to the coupling portion. The third columnar portion is located such that the coupling portion is interposed between the third columnar portion and the core. The third columnar portion is smaller than the coupling portion in width in the track width direction. The coil includes a first winding portion wound around the third columnar portion.

In the thermally-assisted magnetic recording head of the present invention, the core may have an evanescent light generating surface that generates evanescent light based on the light propagating through the core, and the plasmon generator may have a plasmon exciting part that is opposed to the evanescent light generating surface with a predetermined spacing therebetween. In this case, in the plasmon generator, a surface plasmon is excited on the plasmon exciting part through coupling with the evanescent light generated by the evanescent light generating surface, the surface plasmon propagates to the near-field light generating part, and the near-field light generating part generates near-field light based on the surface plasmon.

In the thermally-assisted magnetic recording head of the present invention, the main pole, the coupling portion and the third columnar portion may be located on the same side relative to the core in the direction of travel of the recording medium. In this case, the return path section may further include a yoke layer located opposite from the main pole, the coupling portion and the third columnar portion with the core interposed therebetween. The first and second columnar portions may couple the coupling portion and the yoke layer to each other.

In the thermally-assisted magnetic recording head of the present invention, the coil may further include a second winding portion wound around the coupling portion and connected to the first winding portion.

In the thermally-assisted magnetic recording head of the present invention, the return path section includes the first and second columnar portions, the coupling portion, and the third columnar portion. The third columnar portion is smaller than the coupling portion in width in the track width direction. The coil includes the first winding portion wound around the third columnar portion. According to the present invention, it is thus possible to bring the first and second columnar portions closer to the medium facing surface and reduce the total length of the coil. Consequently, according to the present invention, it is possible to provide a thermally-assisted magnetic recording head configured so that the core of the waveguide and the return path section intersect each other without contacting each other, the thermally-assisted magnetic recording head exhibiting excellent write characteristics in a high frequency band and being low in coil resistance.

Other and further objects, features and advantages of the present invention will appear more fully from the following description.

DETAILED DESCRIPTION OF THE PREFERRED EMBODIMENTS

First Embodiment

Figure 1:
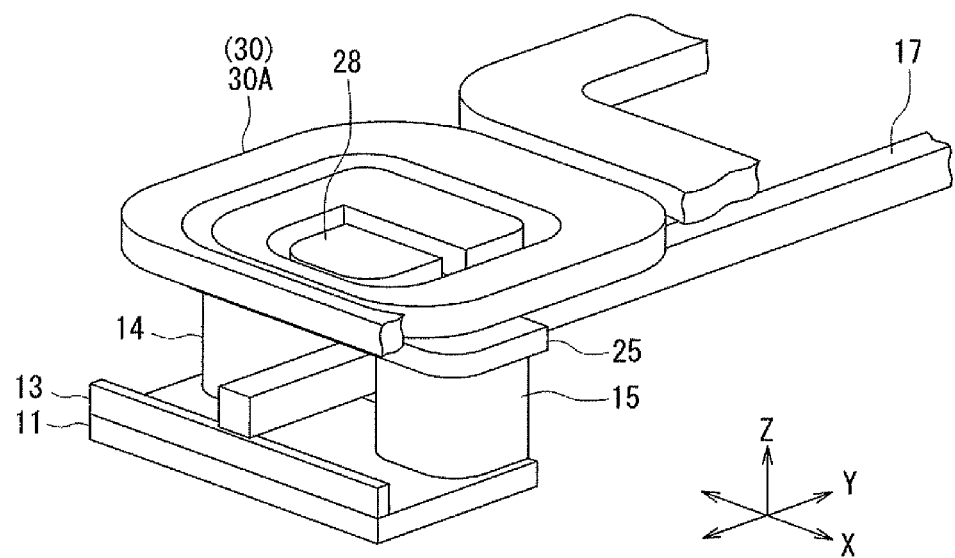
FIG. 1 is a perspective view showing the main part of a thermally-assisted magnetic recording head according to a first embodiment of the invention.
Figure 2:
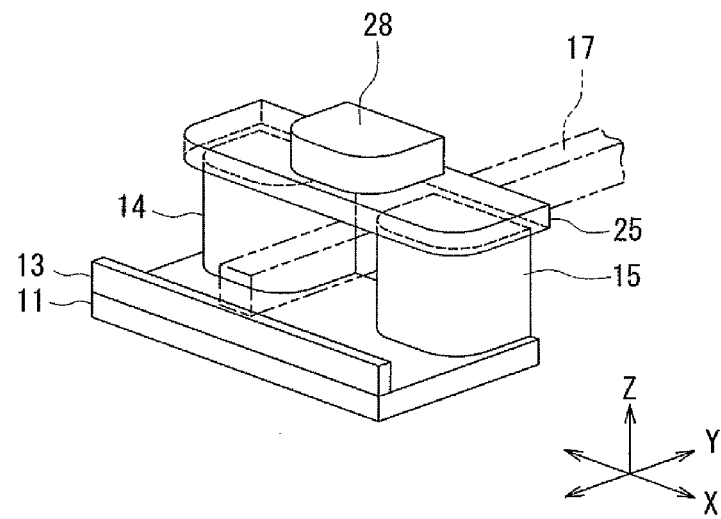
FIG. 2 is a perspective view showing a part of FIG. 1.
Figure 3:
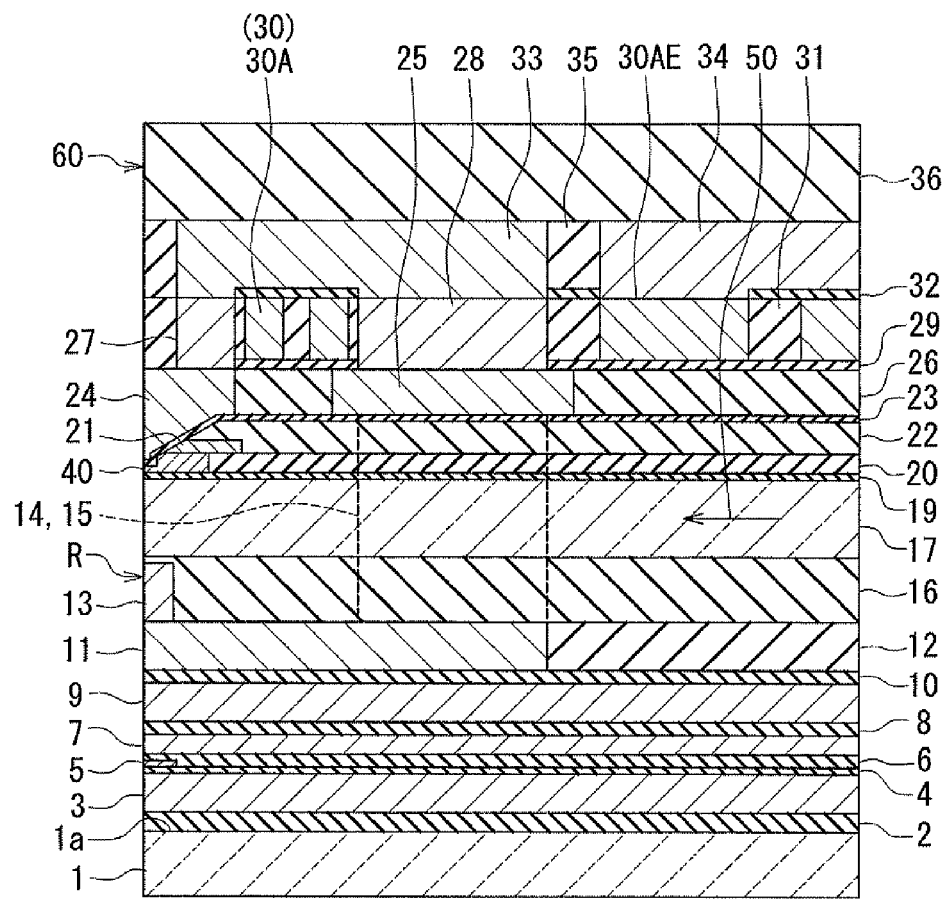
FIG. 3 is a cross-sectional view showing the configuration of the thermally-assisted magnetic recording head according to the first embodiment of the invention.
Figure 4:
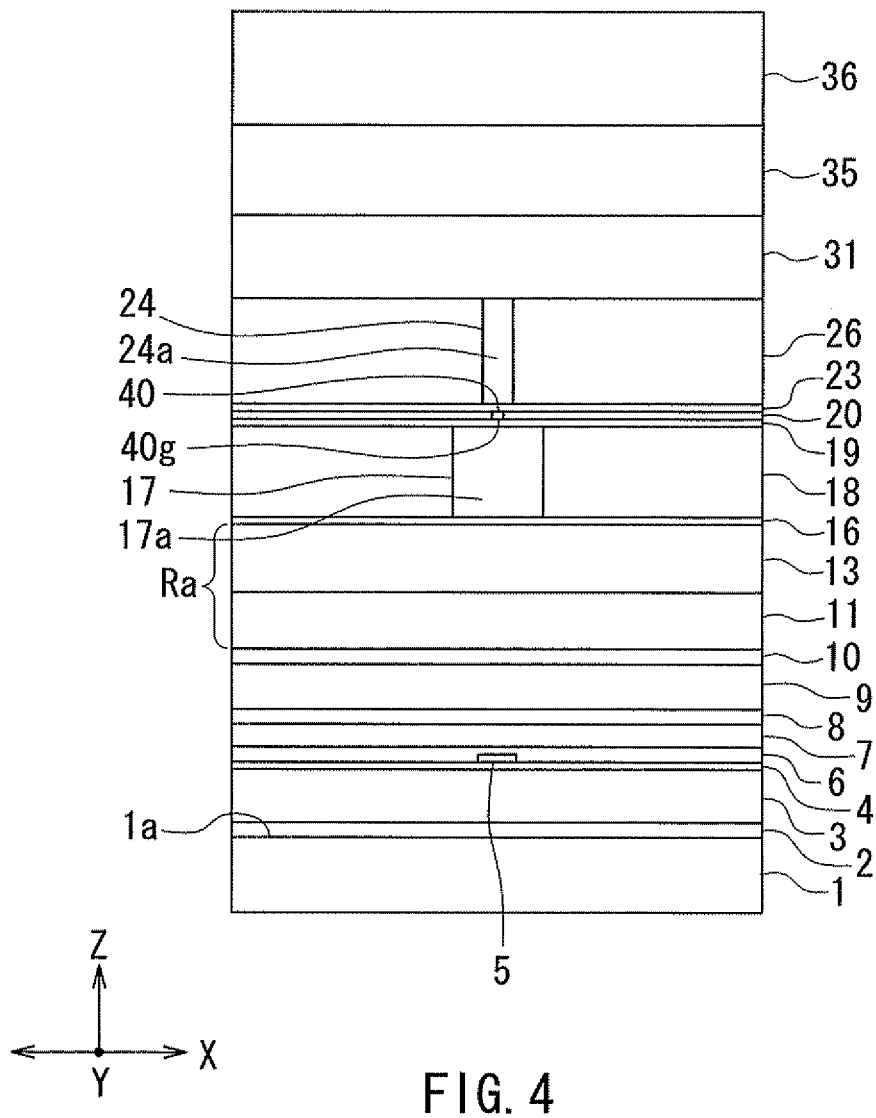
FIG. 4 is a front view showing the medium facing surface of the thermally-assisted magnetic recording head according to the first embodiment of the invention.
Figure 5:
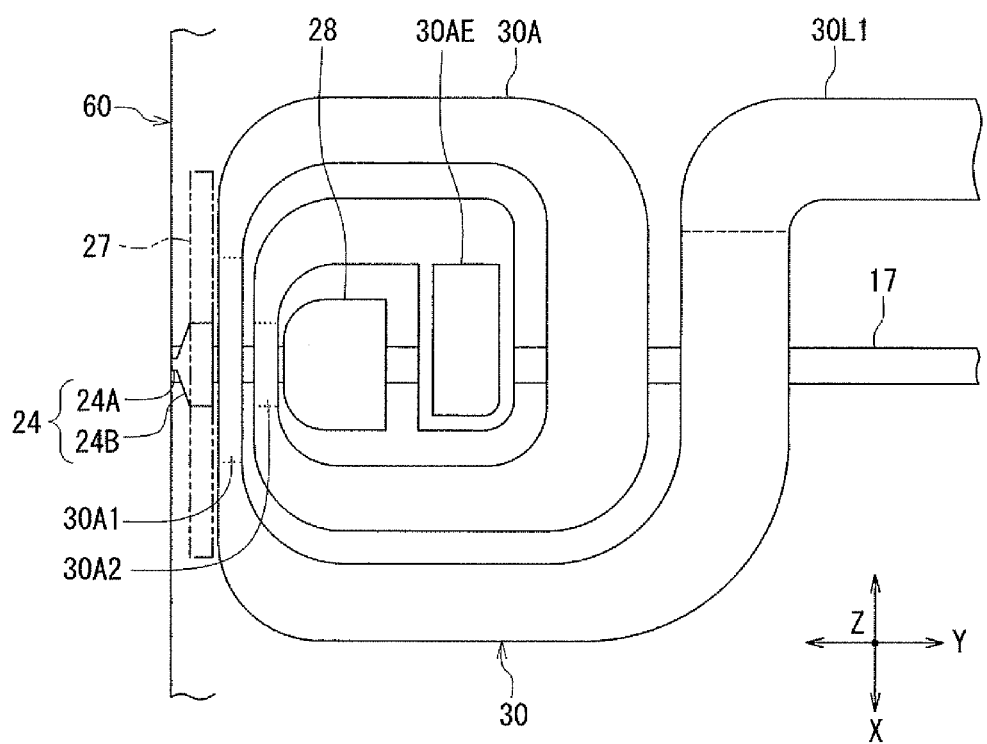
FIG. 5 is a plan view showing a coil of the first embodiment of the invention.
Figure 6:
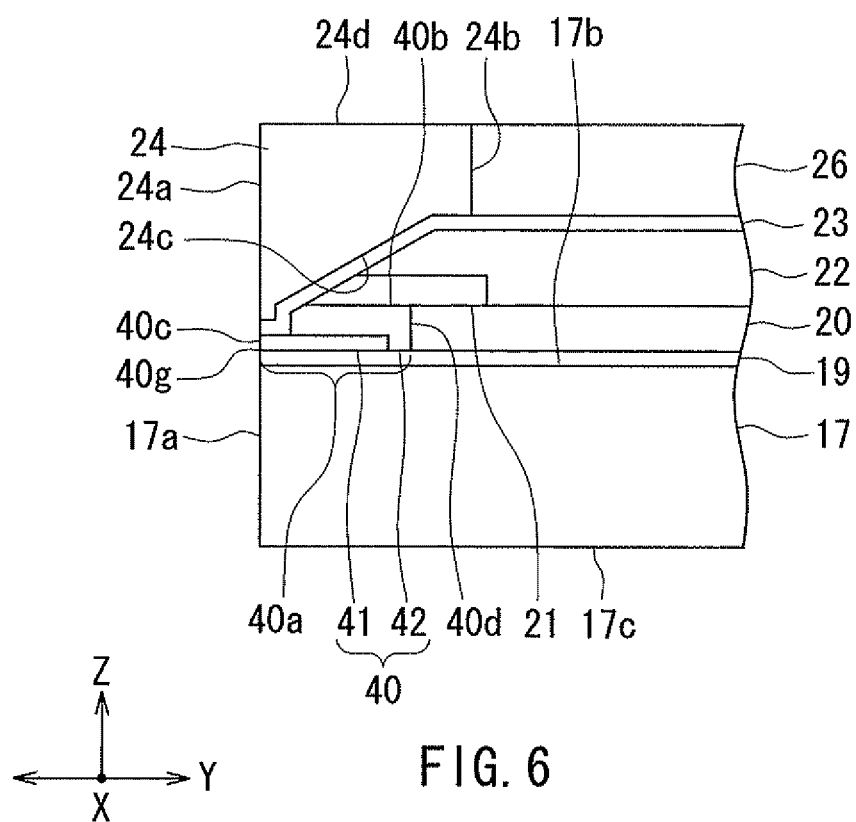
FIG. 6 is a cross-sectional view showing a core, a plasmon generator, and a main pole of the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a perspective view showing the main part of the thermally-assisted magnetic recording head. FIG. 2 is a perspective view showing a part of FIG. 1. FIG. 3 is a cross-sectional view showing the configuration of the thermally-assisted magnetic recording head. FIG. 4 is a front view showing the medium facing surface of the thermally-assisted magnetic recording head. FIG. 5 is a plan view showing a coil of the present embodiment. FIG. 6 is a cross-sectional view showing a core, a plasmon generator, and a main pole of the present embodiment.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 60 that faces the recording medium. Here, X direction, Y direction, and Z direction will be defined as follows. The X direction is the direction across the tracks of the recording medium, i.e., the track width direction. The Y direction is a direction perpendicular to the medium facing surface 60. The Z direction is the direction of travel of the recording medium as viewed from the slider. The X, Y, and Z directions are orthogonal to one another.

As shown in FIG. 3 and FIG. 4, the thermally-assisted magnetic recording head includes: a substrate 1 made of a ceramic material such as aluminum oxide-titanium carbide ($Al_2O_3$.TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 60 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 made of a magnetic material and disposed on the insulating layer 8, and a nonmagnetic layer 10 made of a nonmagnetic material and disposed on the middle shield layer 9. The insulating layer 8 and the nonmagnetic layer 10 are made of alumina, for example.

The thermally-assisted magnetic recording head further includes a yoke layer 11 made of a magnetic material and disposed on the nonmagnetic layer 10, and an insulating layer 12 disposed on the nonmagnetic layer 10 and surrounding the yoke layer 11. The yoke layer 11 has an end face located in the medium facing surface 60. The insulating layer 12 is made of alumina, for example.

The thermally-assisted magnetic recording head further includes a shield layer 13 disposed on the yoke layer 11 in the vicinity of the medium facing surface 60, and a first columnar portion 14 and a second columnar portion 15 disposed away from the medium facing surface 60 and lying on the yoke layer 11. The shield layer 13, the first columnar portion 14, and the second columnar portion 15 are each made of a magnetic material. The shield layer 13 has an end face located in the medium facing surface 60.

The thermally-assisted magnetic recording head further includes a waveguide. The waveguide includes a core 17 through which light propagates, and a cladding provided around the core 17. As shown in FIG. 6, in particular, the core 17 has an end face 17a closer to the medium facing surface 60, an evanescent light generating surface 17b serving as a top surface, a bottom surface 17c, and two side surfaces. The end face 17a may be located in the medium facing surface 60 or away from the medium facing surface 60. FIG. 1 to FIG. 6 show an example in which the end face 17a is located in the medium facing surface 60.

The cladding includes cladding layers 16, 18 and 19. The cladding layer 16 is disposed to cover the yoke layer 11, the insulating layer 12 and the shield layer 13. The core 17 lies on the cladding layer 16. The cladding layer 18 lies on the cladding layer 16 and surrounds the core 17. The cladding layer 19 is disposed over the evanescent light generating surface 17b of the core 17 and the top surface of the cladding layer 18.

The core 17 is made of a dielectric material that transmits laser light to be used for generating near-field light. The laser light emitted from a laser diode (not shown) enters the core 17 and propagates through the core 17. The cladding layers 16, 18 and 19 are each made of a dielectric material that has a refractive index lower than that of the core 17. For example, the core 17 may be made of tantalum oxide such as $Ta_2O_5$ or silicon oxynitride (SiON), whereas the cladding layers 16, 18 and 19 may be made of silicon dioxide ($SiO_2$) or alumina.

Parts of the first and second columnar portions 14 and 15 are embedded in the cladding layers 16, 18 and 19. The first columnar portion 14 and the second columnar portion 15 are located on opposite sides of the core 17 in the track width direction (the X direction) and are each spaced from the core 17.

The thermally-assisted magnetic recording head further includes: a plasmon generator 40 disposed above the evanescent light generating surface 17b of the core 17 in the vicinity of the medium facing surface 60 and lying on the cladding layer 19; and a dielectric layer 20 lying on the cladding layer 19 and surrounding the plasmon generator 40. The plasmon generator 40 is configured to excite surface plasmons on the principle to be described later. The plasmon generator 40 is made of, for example, one of Au, Ag, Al, Cu, Pd, Pt, Rh and Ir, or an alloy composed of two or more of these elements. The dielectric layer 20 is made of the same material as the cladding layers 16, 18 and 19, for example. The shape of the plasmon generator 40 will be described in detail later.

The thermally-assisted magnetic recording head further includes a nonmagnetic metal layer 21 disposed on the plasmon generator 40 and the dielectric layer 20, and a dielectric layer 22 disposed on the dielectric layer 20 and the nonmagnetic metal layer 21. Each of the nonmagnetic metal layer 21 and the dielectric layer 22 has an end face facing toward the medium facing surface 60 and located at a distance from the medium facing surface 60. The distance from the medium facing surface 60 to an arbitrary point on the end face of each of the nonmagnetic metal layer 21 and the dielectric layer 22 increases with increasing distance from the arbitrary point to the top surface 1a of the substrate 1. The nonmagnetic metal layer 21 functions as a heat sink for dissipating heat generated at the plasmon generator 40 outward from the plasmon generator 40. The nonmagnetic metal layer 21 is made of Ru, for example. The dielectric layer 22 is made of the same material as the cladding layers 16, 18 and 19, for example.

The thermally-assisted magnetic recording head further includes an insulating layer 23 disposed over the plasmon generator 40, the nonmagnetic metal layer 21 and the dielectric layer 22. The remainder of the first and second columnar portions 14 and 15 are embedded in the dielectric layers 20 and 22 and the insulating layer 23. The insulating layer 23 is made of alumina, for example.

The thermally-assisted magnetic recording head further includes: a main pole 24 disposed on the insulating layer 23 such that the plasmon generator 40 is interposed between the main pole 24 and the core 17; a coupling portion 25 made of a magnetic material and lying on the first and second columnar portions 14 and 15 and the insulating layer 23; and an insulating layer 26 disposed around the main pole 24 and the coupling portion 25. The main pole 24 has a first end face 24a located in the medium facing surface 60. The coupling portion 25 couples the first and second columnar portions 14 and 15 to each other. The top surfaces of the main pole 24, the coupling portion 25 and the insulating layer 26 are even with each other. The insulating layer 26 is made of alumina, for example. The shape of the main pole 24 will be described in detail later.

The thermally-assisted magnetic recording head further includes a coupling layer 27 disposed on the main pole 24, and a third columnar portion 28 disposed on part of the top surface of the coupling portion 25 and connected to the coupling portion 25. The coupling layer 27 and the third columnar portion 28 are each made of a magnetic material. The coupling layer 27 has a front end face facing toward the medium facing surface 60 and a rear end face opposite thereto. The front end face of the coupling layer 27 is located at a distance from the medium facing surface 60.

The thermally-assisted magnetic recording head further includes an insulating layer 29 and a coil 30. The insulating layer 29 lies on another part of the top surface of the coupling portion 25 and the top surface of the insulating layer 26, and surrounds the coupling layer 27 and the third columnar portion 28. The coil 30 is disposed on the insulating layer 29. As shown in FIG. 5, the coil 30 is wound approximately two turns around the third columnar portion 28. The coil 30 is made of a conductive material such as copper. The insulating layer 29 is made of alumina, for example. The shape and location of the coil 30 will be described in detail later.

The thermally-assisted magnetic recording head further includes an insulating layer 31 disposed around the coupling layer 27, the third columnar portion 28 and the coil 30 and in the space between adjacent turns of the coil 30, and an insulating layer 32 lying on the coil 30 and the insulating layer 31. The insulating layers 31 and 32 are made of alumina, for example.

As shown in FIG. 3, the thermally-assisted magnetic recording head further includes a coupling layer 33 made of a magnetic material and a lead layer 34. The coupling layer 33 lies on the coupling layer 27, the third columnar portion 28 and the insulating layer 32, and magnetically couples the coupling layer 27 and the third columnar portion 28 to each other. The lead layer 34 is located farther from the medium facing surface 60 than is the coupling layer 33 and lies on the insulating layer 32. The lead layer 34 is used for energizing the coil 30, penetrates the insulating layer 32 and is electrically connected to the coil 30. The lead layer 34 is made of a conductive material such as copper.

The thermally-assisted magnetic recording head further includes an insulating layer 35 disposed around the coupling layer 33 and the lead layer 34, and a protective layer 36 disposed to cover the coupling layer 33, the lead layer 34 and the insulating layer 35. The insulating layer 35 and the protective layer 36 are made of alumina, for example.

The parts from the yoke layer 11 to the coupling layer 33 constitute a write head section. The coil 30 produces a magnetic field corresponding to data to be written on a recording medium. The shield layer 13, the yoke layer 11, the columnar portions 14 and 15, the coupling portion 25, the columnar portion 28, the coupling layers 33 and 27, and the main pole 24 form a magnetic path for passing a magnetic flux corresponding to the magnetic field produced by the coil 30. The main pole 24 allows the magnetic flux corresponding to the magnetic field produced by the coil 30 to pass, and produces a write magnetic field for writing data on a recording medium by means of a perpendicular magnetic recording system.

As has been described, the thermally-assisted magnetic recording head according to the present embodiment includes the medium facing surface 60, the read head section, and the write head section. The medium facing surface 60 faces a recording medium. The read head section and the write head section are stacked on the substrate 1. The write head section is located on the front side in the direction of travel of the recording medium (the Z direction) (i.e., the trailing side) relative to the read head section.

The write head section includes the coil 30, the main pole 24, the waveguide, and the plasmon generator 40. The waveguide includes the core 17 and the cladding. The cladding includes the cladding layers 16, 18 and 19.

As shown in FIG. 3, the write head section further includes a return path section R. The return path section R includes the yoke layer 11, the shield layer 13, the columnar portions 14 and 15, the coupling portion 25, the columnar portion 28, and the coupling layers 27 and 33. The return path section R is connected to the main pole 24 so that a space through which part of the coil 30 passes is defined by the main pole 24 and the return path section R. The return path section R is made of magnetic material since the yoke layer 11, the shield layer 13, the columnar portions 14 and 15, the coupling portion 25, the columnar portion 28, and the coupling layers 27 and 33 are each made of magnetic material.

As shown in FIG. 4, the main pole 24 has the first end face 24a located in the medium facing surface 60. The return path section R has a second end face Ra located in the medium facing surface 60. The second end face Ra is composed of the end face of the yoke layer 11 and the end face of the shield layer 13. The first end face 24a and the second end face Ra are located at positions that are different from each other in the direction of travel of the recording medium. In the present embodiment, the first end face 24a is located on the front side in the direction of travel of the recording medium relative to the second end face Ra.

The main pole 24, the coupling portion 25 and the third columnar portion 28 are located on the same side relative to the core 17 in the direction of travel of the recording medium. The yoke layer 11 is located opposite from the main pole 24, the coupling portion 25 and the third columnar portion 28 with the core 17 interposed therebetween. In the present embodiment, as shown in FIG. 3, the main pole 24, the coupling portion 25 and the third columnar portion 28 are located on the front side in the direction of travel of the recording medium relative to the core 17, while the yoke layer 11 is located on the rear side in the direction of travel of the recording medium relative to the core 17. The first and second columnar portions 14 and 15 couple the coupling portion 25 and the yoke layer 11 to each other.

The third columnar portion 28 is located such that the coupling portion 25 is interposed between the third columnar portion 28 and the core 17. In the present embodiment, as shown in FIG. 3, the third columnar portion 28 is located on the front side in the direction of travel of the recording medium relative to the core 17 and the coupling portion 25. As shown in FIG. 2, the third columnar portion 28 is smaller than the coupling portion 25 in width in the track width direction (the X direction).

The shape and location of the coil 30 will now be described in detail with reference to FIG. 5. As shown in FIG. 5, the coil 30 includes a lead portion 30L1, and a first winding portion 30A of planar spiral shape that is contiguous with the lead portion 30L1 and wound around the third columnar portion 28. In FIG. 5 the boundary between the lead portion 30L1 and the first winding portion 30A is shown by a broken line. The first winding portion 30A is wound approximately two turns around the third columnar portion 28.

Further, as shown in FIG. 5, the first winding portion 30A includes a coil connection part 30AE electrically connected to the lead layer 34, and two conductor portions (hereinafter referred to as linear conductor portions) 30A1 and 30A2 interposed between the third columnar portion 28 and the medium facing surface 60 and extending linearly in parallel to the medium facing surface 60. The linear conductor portions 30A1 and 30A2 are aligned in this order in the direction perpendicular to the medium facing surface 60, the linear conductor portion 30A1 being closer to the medium facing surface 60. Each of the linear conductor portions 30A1 and 30A2 has a constant width in the direction perpendicular to the medium facing surface 60 (the Y direction). In FIG. 5, the positions of opposite ends of each of the linear conductor portions 30A1 and 30A2 in the track width direction (the X direction) are shown by dotted lines. This also applies to other drawings that show other linear conductor portions. As viewed from above, the first winding portion 30A is wound in a clockwise direction from the boundary between the first winding portion 30A and the lead portion 30L1 toward the coil connection part 30AE.

The location of the lead layer 34 is not limited to the example shown in FIG. 3. For example, the lead layer 34 may be located on the insulating layer 23. In this case, the coil connection part 30AE of the first winding portion 30A penetrates the insulating layer 29 and is electrically connected to the lead layer 34.

An example of the shape of the plasmon generator 40 will now be described with reference to FIG. 6. The plasmon generator 40 has a plasmon exciting part 40a serving as a bottom surface, a top surface 40b, a front end face 40c located in the medium facing surface 60, and a rear end face 40d opposite to the front end face 40c. The plasmon exciting part 40a is opposed to the evanescent light generating surface 17b of the core 17 with a predetermined spacing therebetween. The cladding layer 19 is interposed between the evanescent light generating surface 17b and the plasmon exciting part 40a. For example, the plasmon generator 40 is rectangular in cross section parallel to the medium facing surface 60.

The front end face 40c has a near-field light generating part 40g located at the front extremity of the plasmon exciting part 40a. The near-field light generating part 40g is located between the first end face 24a of the main pole 24 and the second end face Ra of the return path section R. The near-field light generating part 40g generates near-field light on the principle to be described later.

As shown in FIG. 6, the plasmon generator 40 includes a first layer 41 located in the vicinity of the medium facing surface 60 and a second layer 42 disposed to cover the first layer 41. The first layer 41 has a front end face located in the medium facing surface 60 and a bottom surface opposed to the evanescent light generating surface 17b of the core 17. The front end face of the first layer 41 also serves as the front end face 40c of the plasmon generator 40.

Although not illustrated, the first layer 41 includes a narrow portion located in the vicinity of the medium facing surface 60 and a wide portion that is located farther from the medium facing surface 60 than is the narrow portion. The narrow portion has a front end face located in the medium facing surface 60. The front end face of the narrow portion also serves as the front end face of the first layer 41 and as the front end face 40c of the plasmon generator. The width of the narrow portion in the direction parallel to the medium facing surface 60 and to the top surface 1a of the substrate 1 (the X direction) may be constant regardless of the distance from the medium facing surface 60 or may decrease with increasing proximity to the medium facing surface 60. The wide portion is located on a side of the narrow portion farther from the front end face 40c and is coupled to the narrow portion. The width of the wide portion is the same as that of the narrow portion at the boundary between the narrow portion and the wide portion, and increases with increasing distance from the narrow portion.

The width (the dimension in the track width direction (the X direction)) of the front end face 40c is defined by the width of the first layer 41 in the medium facing surface 60. The width of the front end face 40c falls within the range of 5 to 40 nm, for example. The height (the dimension in the Z direction) of the front end face 40c is defined by the height of the first layer 41 in the medium facing surface 60. The height of the front end face 40c falls within the range of 5 to 40 nm, for example.

The second layer 42 is larger than the wide portion of the first layer 41 in planar shape (the shape seen from above), and covers a part of the first layer 41 away from the medium facing surface 60. The second layer 42 has a front end face facing toward the medium facing surface 60, a bottom surface opposed to the evanescent light generating surface 17b of the core 17, a top surface, and a connecting surface connecting the front end face and the top surface to each other. The front end face of the second layer 42 is located at a distance from the medium facing surface 60. The distance from the medium facing surface 60 to an arbitrary point on the connecting surface of the second layer 42 increases with increasing distance from the arbitrary point to the top surface 1a of the substrate 1. The plasmon exciting part 40a is composed of the bottom surface of the first layer 41 and the bottom surface of the second layer 42.

An example of the shape of the main pole 24 will now be described with reference to FIG. 5 and FIG. 6. The main pole 24 has the first end face 24a, and further has a rear end face 24b opposite to the first end face 24a, a bottom surface 24c, a top surface 24d, and two side surfaces. The bottom surface 24c is opposed to part of the top surface 40b of the plasmon generator 40 with the dielectric layer 23 interposed therebetween. The distance from the top surface 1a of the substrate 1 to an arbitrary point on the bottom surface 24c increases with increasing distance from the arbitrary point to the medium facing surface 60.

As shown in FIG. 5, the main pole 24 includes a narrow portion 24A and a wide portion 24B. The narrow portion 24A has an end face located in the medium facing surface 60 and an end portion opposite to the end face. The wide portion 24B is connected to the end portion of the narrow portion 24A. The wide portion 24B is greater than the narrow portion 24A in width in the track width direction (the X direction). The width of the narrow portion 24A in the track width direction is generally constant regardless of the distance from the medium facing surface 60. The width of the wide portion 24B in the track width direction is the same as that of the narrow portion 24A at the boundary between the narrow portion 24A and the wide portion 24B, and gradually increases with increasing distance from the medium facing surface 60, then becoming constant. The narrow portion 24A has a length in the range of, for example, 0 to 0.3 µm in the direction perpendicular to the medium facing surface 60. Where this length is 0, there is no narrow portion 24A and thus the wide portion 24B has an end face located in the medium facing surface 60.

The distance between the bottom surface 24c of the main pole 24 and the evanescent light generating surface 17b of the core 17 increases with increasing distance from the medium facing surface 60. The present embodiment thus makes it possible to prevent the light propagating through the core 17 from being absorbed in part by the main pole 24 and to prevent the surface plasmons excited on the plasmon exciting part 40a from being absorbed in part by the main pole 24.

Now, the principle of generation of near-field light in the present embodiment and the principle of thermally-assisted magnetic recording using near-field light will be described in detail. Laser light emitted from a laser diode (not shown) enters the core 17. As shown in FIG. 3, the laser light 50 propagates through the core 17 toward the medium facing surface 60, and reaches the vicinity of the plasmon generator 40. The evanescent light generating surface 17b of the core 17 generates evanescent light based on the laser light 50 propagating through the core 17. More specifically, the laser light 50 is totally reflected at the evanescent light generating surface 17b, and the evanescent light generating surface 17b thereby generates evanescent light which permeates into the cladding layer 19. In the plasmon generator 40, surface plasmons are excited on the plasmon exciting part 40a through coupling with the aforementioned evanescent light. The surface plasmons propagate to the near-field light generating part 40g, and the near-field light generating part 40g generates near-field light based on the surface plasmons.

The near-field light generated from the near-field light generating part 40g is projected toward a recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 24 for data writing.

A description will now be given of the specific function and effects of the thermally-assisted magnetic recording head according to the present embodiment. In the present embodiment, the near-field light generating part 40g of the plasmon generator 40 is located between the first end face 24a of the main pole 24 and the second end face Ra of the return path section R. Part of the core 17 is located in the vicinity of the plasmon generator 40. The core 17 and the return path section R are configured to intersect each other without contacting each other. Specifically, in the present embodiment, the return path section R includes the first and second columnar portions 14 and 15, the coupling portion 25, and the third columnar portion 28. The core 17 passes between the first and second columnar portions 14 and 15 without contacting the first and second columnar portions 14 and 15.

The coupling portion 25 couples the first and second columnar portions 14 and 15 to each other. The coupling portion 25 thus has a width of a certain magnitude in the track width direction (the X direction). The third columnar portion 28 is smaller than the coupling portion 25 in width in the track width direction. The coil 30 includes the first winding portion 30A wound around the third columnar portion 28. According to the present embodiment, it is thus possible to bring the first and second columnar portions 14 and 15 closer to the medium facing surface 60 and reduce the entire length of the coil 30. This advantageous effect will now be described in detail in comparison with a thermally-assisted magnetic recording head of a comparative example.

Figure 7:
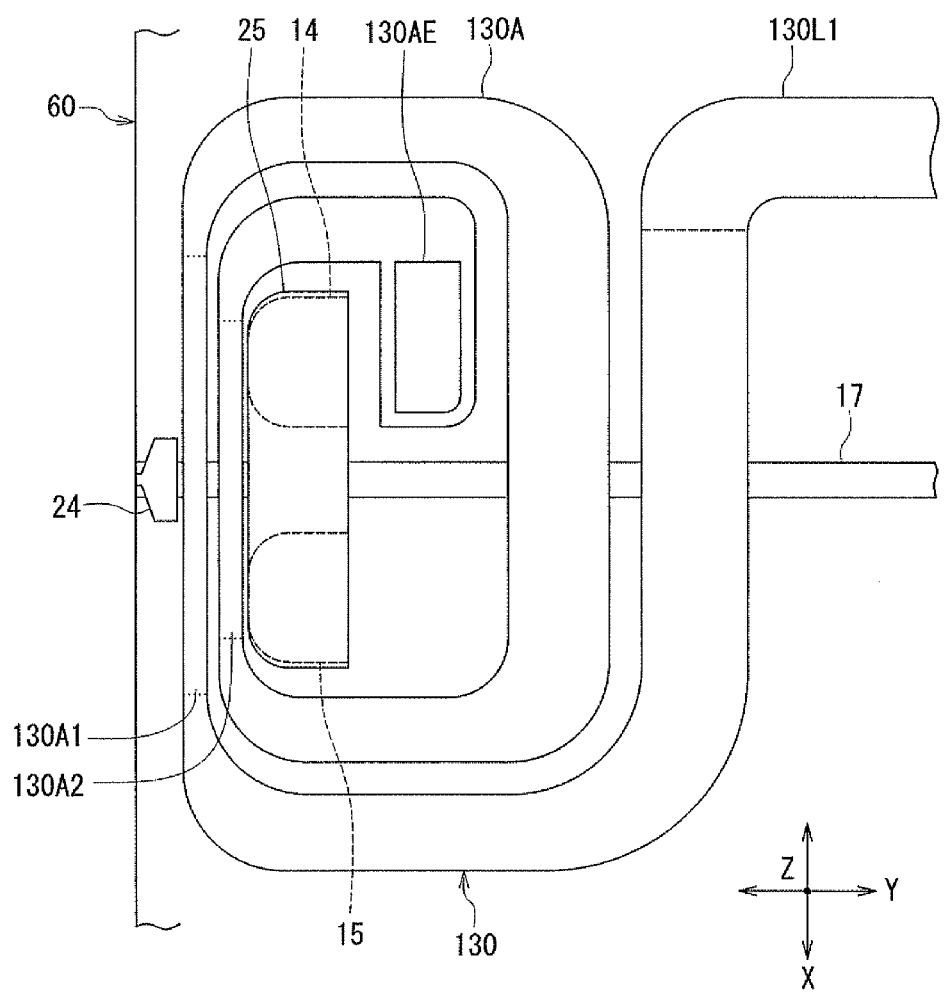
FIG. 7 is a plan view showing a coil of a thermally-assisted magnetic recording head of a comparative example.

First, the configuration of the thermally-assisted magnetic recording head of the comparative example will be described with reference to FIG. 7. FIG. 7 is a plan view showing a coil of the thermally-assisted magnetic recording head of the comparative example. In the thermally-assisted magnetic recording head of the comparative example, the coupling layer 27 and the third columnar portion 28 are not provided and the coupling layer 33 couples the main pole 24 and the coupling portion 25 to each other. Further, the thermally-assisted magnetic recording head of the comparative example has a coil 130 in place of the coil 30 of the present embodiment. The coil 130 includes a lead portion 130L1, and a winding portion 130A of planar spiral shape that is contiguous with the lead portion 130L1 and wound around the coupling portion 25. In FIG. 7 the boundary between the lead portion 130L1 and the winding portion 130A is shown by a broken line. The winding portion 130A is wound approximately two turns around the coupling portion 25.

Further, as shown in FIG. 7, the winding portion 130A includes a coil connection part 130AE electrically connected to the lead layer 34, and two linear conductor portions 130A1 and 130A2 interposed between the coupling portion 25 and the medium facing surface 60 and extending linearly in parallel to the medium facing surface 60. The linear conductor portions 130A1 and 130A2 are aligned in this order in the direction perpendicular to the medium facing surface 60, the linear conductor portion 130A1 being closer to the medium facing surface 60. Each of the linear conductor portions 130A1 and 130A2 has a constant width in the direction perpendicular to the medium facing surface 60 (the Y direction). As viewed from above, the winding portion 130A is wound in a clockwise direction from the boundary between the winding portion 130A and the lead portion 130L1 toward the coil connection part 130AE. The remainder of the configuration of the thermally-assisted magnetic recording head of the comparative example is the same as that of the thermally-assisted magnetic recording head according to the present embodiment.

As shown in FIG. 7, the width of the coupling portion 25 in the track width direction (the X direction) is equal to or greater than the distance between the respective outer ends of the first and second columnar portions 14 and 15 in the track width direction, and is thus comparatively great. In the thermally-assisted magnetic recording head of the comparative example, the winding portion 130A is great in entire length since it is wound around the coupling portion 25. As a result, the winding portion 130A has a high resistance and thus has a high heating value. This causes components around the winding portion 130A to expand, thus causing part of the medium facing surface 60 to protrude toward a recording medium and become more likely to collide with the recording medium. In order to prevent this, the distance between the medium facing surface 60 and the recording medium could be increased. However, this would lead to deterioration in write characteristics such as the overwrite property or to an increase in error rate.

On the other hand, in order to improve the write characteristics in a high frequency band, it is desirable to reduce the length of the magnetic path formed by the main pole 24 and the return path section R. To that end, it is effective to bring the first and second columnar portions 14 and 15 closer to the medium facing surface 60. If the first and second columnar portions 14 and 15 are brought closer to the medium facing surface 60 in the thermally-assisted magnetic recording head of the comparative example, the coupling portion 25 is also located closer to the medium facing surface 60, so that the linear conductor portions 130A1 and 130A2 interposed between the coupling portion 25 and the medium facing surface 60 become narrow and long. This makes the winding portion 130A higher in resistance, thus causing the various problems described previously to occur noticeably.

In contrast, in the present embodiment, the first winding portion 30A of the coil 30 is wound around the third columnar portion 28. The width of the third columnar portion 28 in the track width direction is smaller than that of the coupling portion 25 which couples the first and second columnar portions 14 and 15 to each other. Consequently, the linear conductor portions 30A1 and 30A2 of the first winding portion 30A are smaller than the linear conductor portions 130A1 and 130A2 of the winding portion 130A in length in the track width direction.

An example of the sizes of the winding portions 30A and 130A will now be described. In this example, the linear conductor portions 30A1 and 30A2 of the first winding portion 30A have lengths in the track width direction of 6.0 μm and 2.0 respectively, whereas the linear conductor portions 130A1 and 130A2 of the winding portion 130A have lengths in the track width direction of 12.6 μm and 8.6 μm, respectively. In this example, the length of the linear conductor portion 30A1 is reduced to approximately 48% of the length of the linear conductor portion 130A1, and the length of the linear conductor portion 30A2 is reduced to approximately 23% of the length of the linear conductor portion 130A2.

Further, in this example, the first winding portion 30A has a dimension in the track width direction of 16.4 μm, whereas the winding portion 130A has a dimension in the track width direction of 20.4 μm. The first winding portion 30A and the winding portion 130A are both 16.9 μm in dimension in the direction perpendicular to the medium facing surface 60. Thus, the first winding portion 30A is smaller in size than the winding portion 130A. The entire length of the first winding portion 30A is therefore smaller than that of the winding portion 130A.

In the present embodiment, as described above, the linear conductor portions 30A1 and 30A2 of the first winding portion 30A are reduced in length. This allows the first and second columnar portions 14 and 15, the coupling portion 25 and the third columnar portion 28 to be brought closer to the medium facing surface 60 without an excessive increase in resistance of the first winding portion 30A. Thus, according to the present embodiment, it is possible to bring the first and second columnar portions 14 and 15 closer to the medium facing surface 60 and reduce the entire length of the coil 30. Consequently, according to the present embodiment, it is possible to provide a thermally-assisted magnetic recording head that exhibits excellent write characteristics in a high frequency band and has the coil 30 of a low resistance.

Second Embodiment

Figure 8:
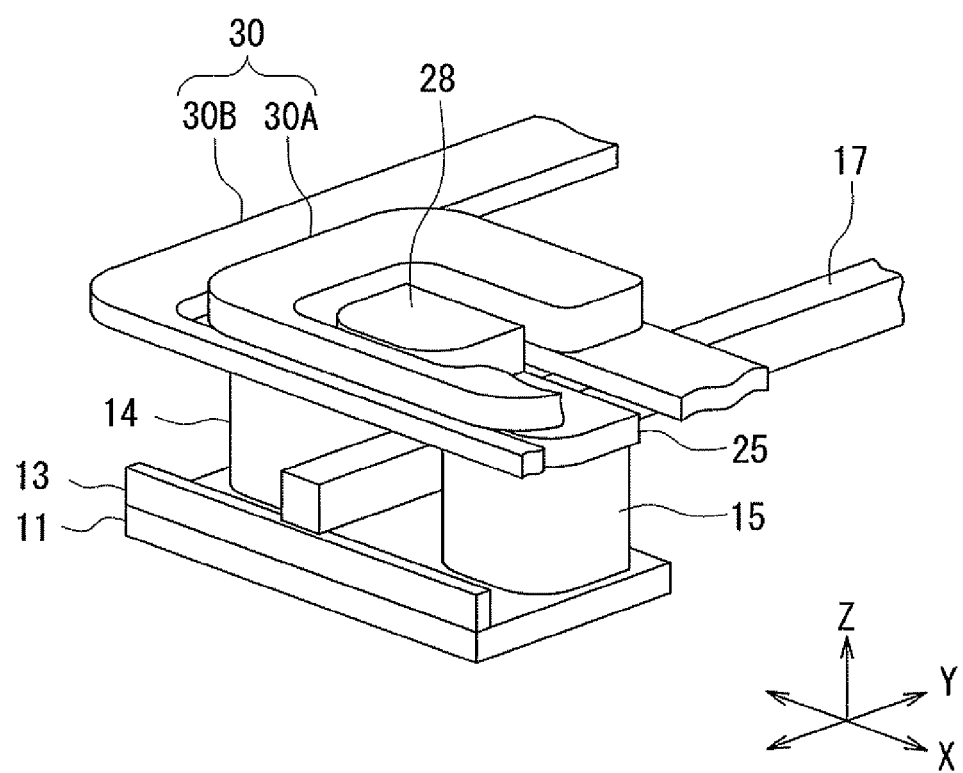
FIG. 8 is a perspective view showing the main part of a thermally-assisted magnetic recording head according to a second embodiment of the invention.
Figure 9:
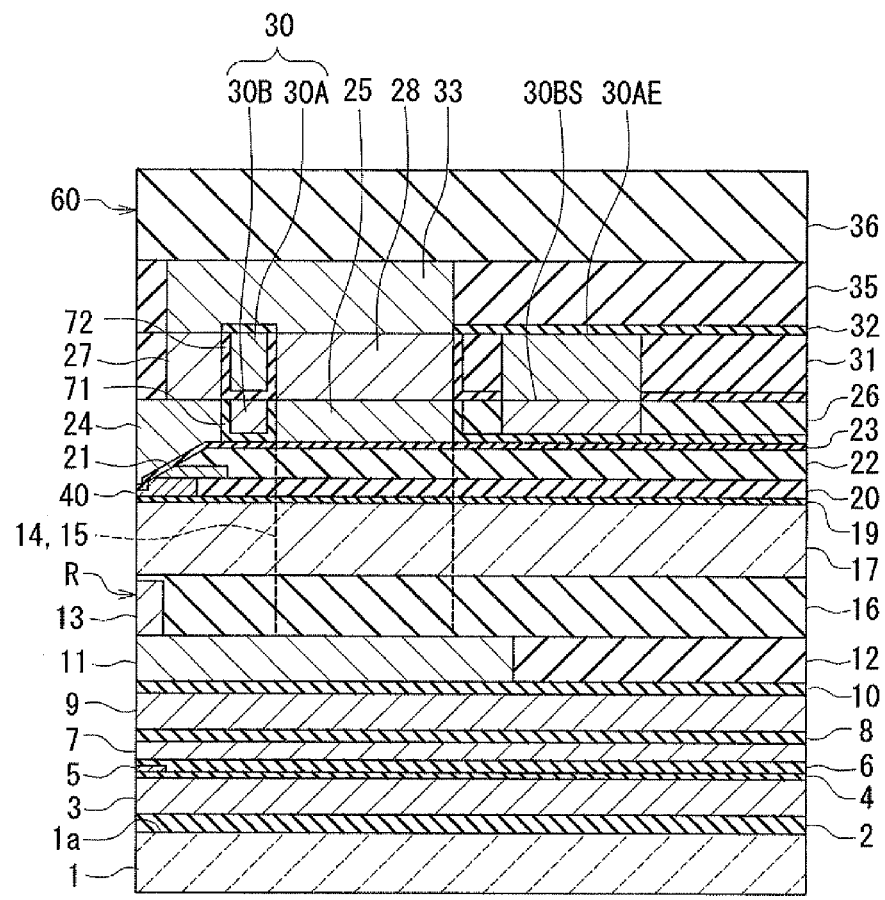
FIG. 9 is a cross-sectional view showing the configuration of the thermally-assisted magnetic recording head according to the second embodiment of the invention.
Figure 10:
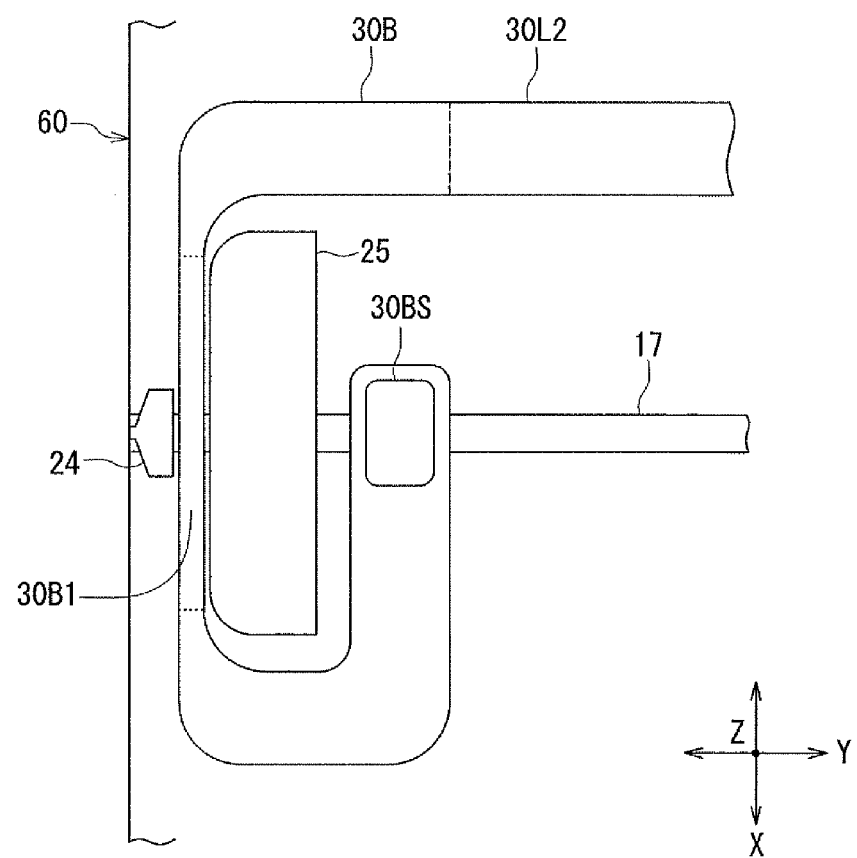
FIG. 10 is a plan view showing a second winding portion of a coil of the second embodiment of the invention.
Figure 11:
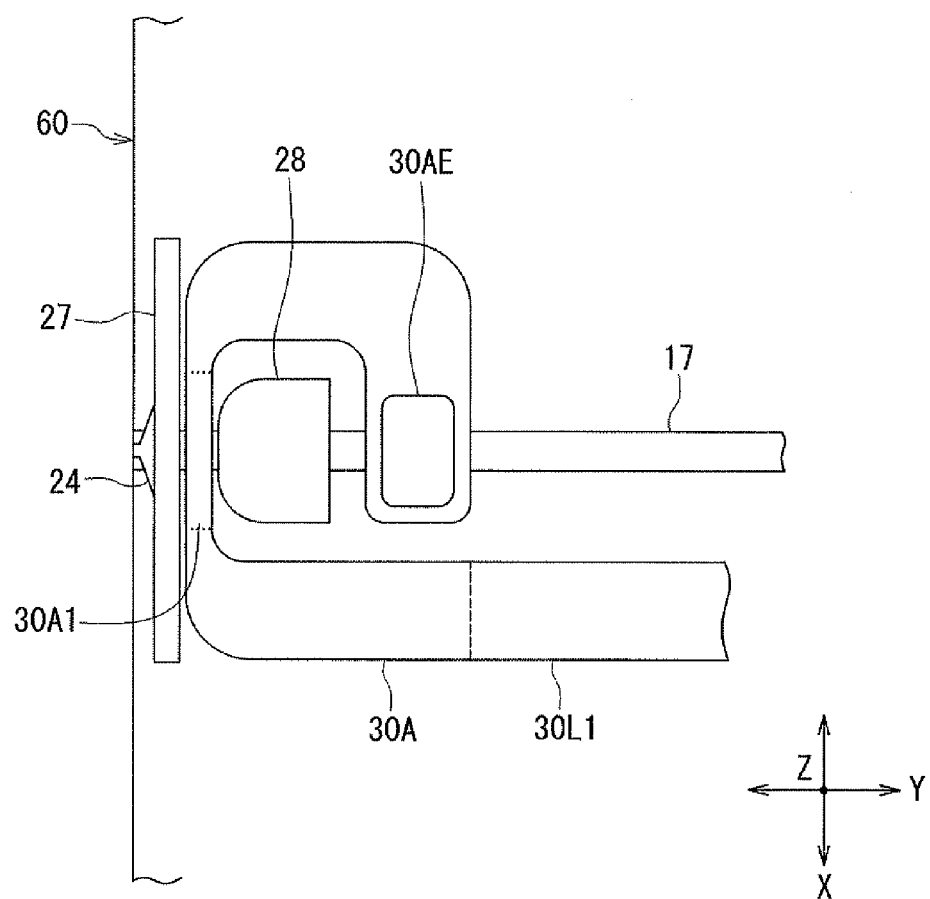
FIG. 11 is a plan view showing a first winding portion of the coil of the second embodiment of the invention.

A thermally-assisted magnetic recording head according to a second embodiment of the invention will now be described with reference to FIG. 8 to FIG. 11. FIG. 8 is a perspective view showing the main part of the thermally-assisted magnetic recording head. FIG. 9 is a cross-sectional view showing the configuration of the thermally-assisted magnetic recording head. FIG. 10 is a plan view showing a second winding portion of the coil. FIG. 11 is a plan view showing a first winding portion of the coil.

The configuration of the thermally-assisted magnetic recording head according to the present embodiment is different from that of the head according to the first embodiment as follows. In the thermally-assisted magnetic recording head according to the present embodiment, as shown in FIG. 11, the first winding portion 30A of the coil 30 is wound approximately one turn around the third columnar portion 28. The first winding portion 30A has only a single linear conductor portion 30A1.

Further, in the present embodiment, the coil 30 includes a second winding portion 30B and a lead portion 30L2 in addition to the lead portion 30L1 and the first winding portion 30A. The second winding portion 30B is wound around the coupling portion 25 and connected to the first winding portion 30A. The lead portion 30L2 is contiguous with the second winding portion 30B. In FIG. 10 the boundary between the second winding portion 30B and the lead portion 30L2 is shown by a broken line. As shown in FIG. 10, the second winding portion 30B is wound approximately one turn around the coupling portion 25.

As shown in FIG. 10, the second winding portion 30B has a coil connection part 30BS electrically connected to the coil connection part 30AE of the first winding portion 30A, and a linear conductor portion 30B1 interposed between the coupling portion 25 and the medium facing surface 60 and extending linearly in parallel to the medium facing surface 60. The linear conductor portion 30B1 has a constant width in the direction perpendicular to the medium facing surface 60 (the Y direction). As viewed from above, the second winding portion 30A is wound in a clockwise direction from the coil connection part 30BS toward the boundary between the second winding portion 30A and the lead portion 30L2.

The thermally-assisted magnetic recording head according to the present embodiment further includes insulating films 71 and 72. The insulating film 71 isolates the second winding portion 30B and the lead portion 30L2 from the main pole 24, the coupling portion 25 and the insulating layer 23. The insulating film 72 isolates the first winding portion 30A and the lead portion 30L1 from the coupling layer 27, the third columnar portion 28, the second winding portion 30B and the insulating layer 26. The coil connection part 30AE of the first winding portion 30A penetrates the insulating film 72 and is electrically connected to the coil connection part 30BS of the second winding portion 30B. The lead layer 34 is not provided in the present embodiment. The insulating films 71 and 72 are made of alumina, for example.

In the present embodiment, the number of turns of the first winding portion 30A is approximately one, and that of the second winding portion 30B is also approximately one. Consequently, the total magnetomotive force produced by the first winding portion 30A and the second winding portion 30B in the present embodiment is almost equal to the magnetomotive force produced by the first winding portion 30A of the first embodiment whose number of turns is approximately two. On the other hand, since the number of turns of the first winding portion 30A in the present embodiment is smaller as compared with the first embodiment, it is possible according to the present embodiment to bring the first and second columnar portions 14 and 15, the coupling portion 25 and the third columnar portion 28 closer to the medium facing surface 60. The present embodiment thus allows a reduction in length of the magnetic path formed by the main pole 24 and the return path section R while allowing the magnitude of the write magnetic field produced by the main pole 24 to be equivalent to that in the first embodiment. Consequently, according to the present embodiment, it is possible to provide a thermally-assisted magnetic recording head that exhibits excellent write characteristics in a high frequency band.

The remainder of configuration, function and effects of the present embodiment are similar to those of the first embodiment.

Third Embodiment

Figure 12:
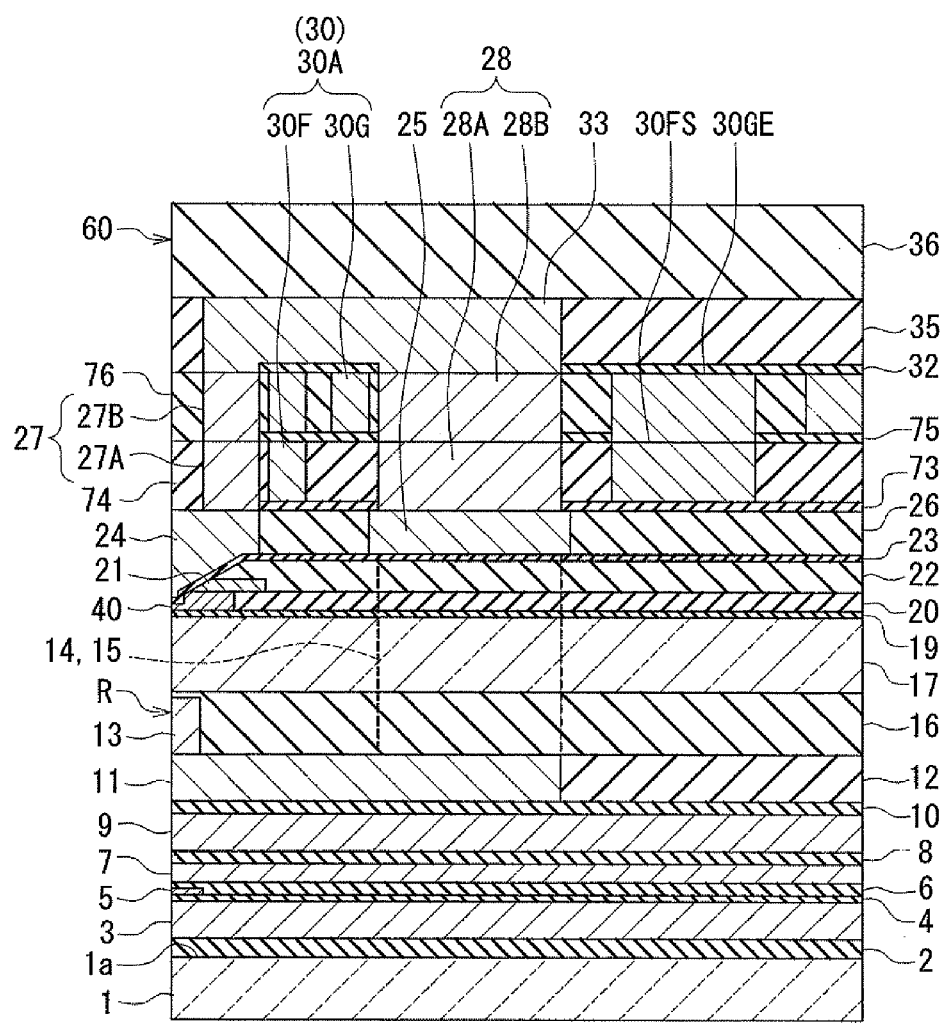
FIG. 12 is a cross-sectional view showing the configuration of a thermally-assisted magnetic recording head according to a third embodiment of the invention.
Figure 12:
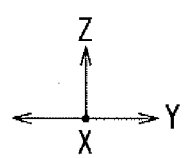
Figure 13:
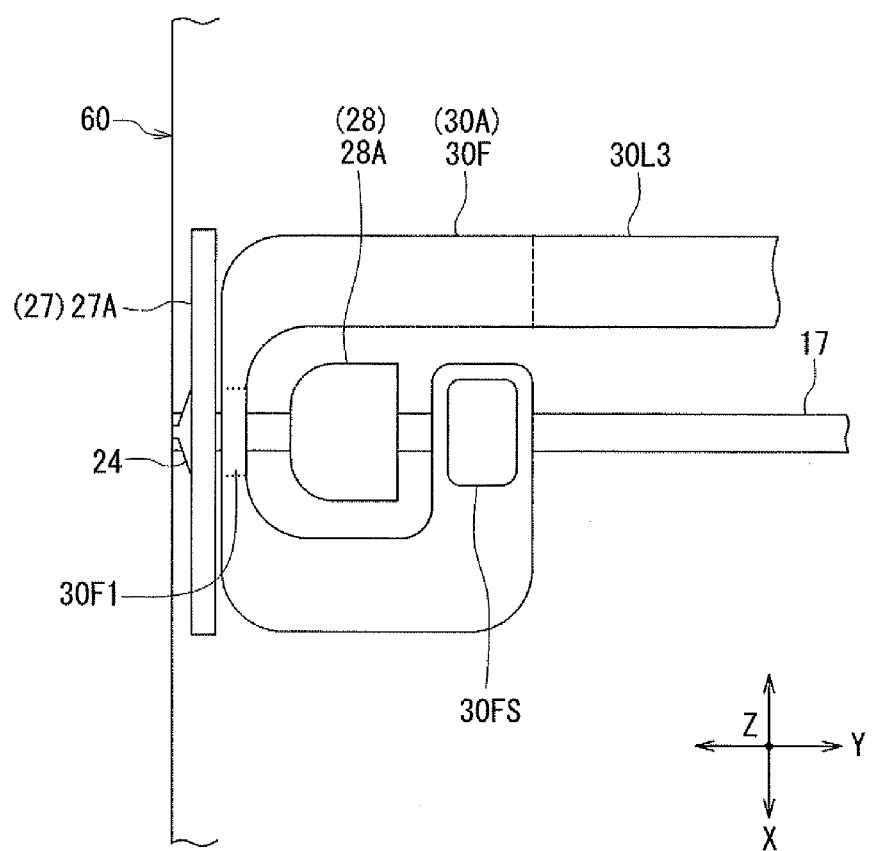
FIG. 13 is a plan view showing a first layer of a first winding portion of a coil of the third embodiment of the invention.
Figure 14:
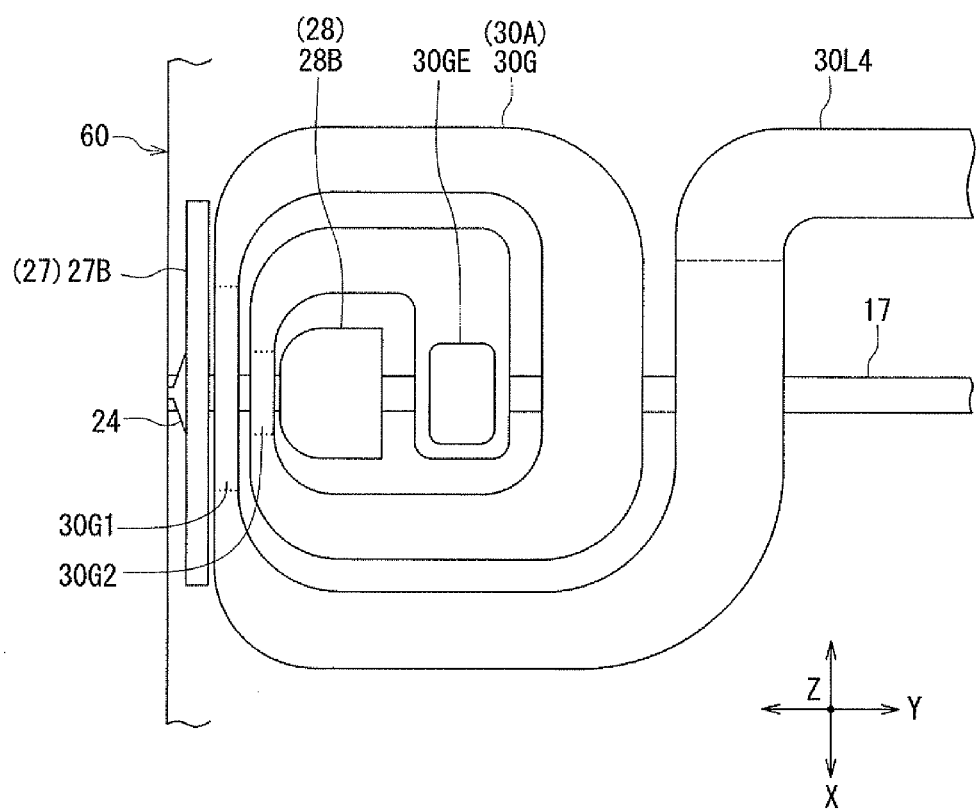
FIG. 14 is a plan view showing a second layer of the first winding portion of the coil of the third embodiment of the invention.

A thermally-assisted magnetic recording head according to a third embodiment of the invention will now be described with reference to FIG. 12 to FIG. 14. FIG. 12 is a cross-sectional view showing the configuration of the thermally-assisted magnetic recording head. FIG. 13 is a plan view showing a first layer of a first winding portion of the coil. FIG. 14 is a plan view showing a second layer of the first winding portion of the coil.

The configuration of the thermally-assisted magnetic recording head according to the present embodiment is different from that of the head according to the first embodiment as follows. In the thermally-assisted magnetic recording head according to the present embodiment, the coupling layer 27 of the return path section R includes a first layer 27A and a second layer 27B stacked in this order on the main pole 24, and the third columnar portion 28 includes a first layer 28A and a second layer 28B stacked in this order on the coupling portion 25. The coupling layer 33 magnetically couples the second layer 27B of the coupling layer 27 to the second layer 28B of the third columnar portion 28.

Further, in the present embodiment, the first winding portion 30A of the coil 30 includes a first layer 30F wound around the first layer 28A of the third columnar portion 28, and a second layer 30G wound around the second layer 28B of the third columnar portion 28 and connected to the first layer 30F. The coil 30 includes a lead portion 30L3 contiguous with the first layer 30F and a lead portion 30L4 contiguous with the second layer 30G, in place of the lead portion 30L1 and the lead layer 34. In FIG. 13 the boundary between the first layer 30F and the lead portion 30L3 is shown by a broken line. In FIG. 14 the boundary between the second layer 30G and the lead portion 30L4 is shown by a broken line.

As shown in FIG. 13, the first layer 30F of the first winding portion 30A is wound approximately one turn around the first layer 28A of the third columnar portion 28. The first layer 30F has a coil connection part 30FS electrically connected to the second layer 30G, and a linear conductor portion 30F1 interposed between the first layer 28A and the medium facing surface 60 and extending linearly in parallel to the medium facing surface 60. The linear conductor portion 30F1 has a constant width in the direction perpendicular to the medium facing surface 60 (the Y direction). As viewed from above, the first layer 30F is wound in a clockwise direction from the coil connection part 30FS toward the boundary between the first layer 30F and the lead portion 30L3.

As shown in FIG. 14, the second layer 30G of the first winding portion 30A is wound approximately two turns around the second layer 28B of the third columnar portion 28. The second layer 30G has a coil connection part 30GE electrically connected to the coil connection part 30FS of the first layer 30F, and two linear conductor portions 30G1 and 30G2 interposed between the second layer 28B and the medium facing surface 60 and extending linearly in parallel to the medium facing surface 60. The linear conductor portions 30G1 and 30G2 are aligned in this order in the direction perpendicular to the medium facing surface 60, the linear conductor portion 30G1 being closer to the medium facing surface 60. Each of the linear conductor portions 30G1 and 30G2 has a constant width in the direction perpendicular to the medium facing surface 60 (the Y direction). As viewed from above, the second layer 30G is wound in a clockwise direction from the boundary between the second layer 30G and the lead portion 30L4 toward the coil connection part 30GE.

Further, the thermally-assisted magnetic recording head according to the present embodiment includes insulating layers 73, 74, 75 and 76 in place of the insulating layers 29 and 31. The insulating layer 73 is disposed on part of the top surface of the coupling portion 25 and the top surface of the insulating layer 26 and surrounds the first layer 27A of the coupling layer 27 and the first layer 28A of the third columnar portion 28. The first layer 30F of the first winding portion 30A and the lead portion 30L3 are disposed on the insulating layer 73. The insulating layer 74 is disposed around the first layer 27A, the first layer 28A, the first layer 30F, and the lead portion 30L3.

The insulating layer 75 is disposed on the first layer 30F of the first winding portion 30A, the lead portion 30L3 and the insulating layer 74 and surrounds the second layer 27B of the coupling layer 27 and the second layer 28B of the third columnar portion 28. The second layer 30G of the first winding portion 30A and the lead portion 30L4 are disposed on the insulating layer 75. The insulating layer 76 is disposed around the second layer 27B, the second layer 28B, the second layer 30G and the lead portion 30L4 and in the space between adjacent turns of the second layer 30G. In the present embodiment, the insulating layer 32 is disposed on the second layer 30G, the lead portion 30L4 and the insulating layer 76. The insulating layers 73 to 76 are made of alumina, for example.

The coil connection part 30GE of the second layer 30G of the first winding portion 30A penetrates the insulating layer 75 and is electrically connected to the coil connection part 30FS of the first layer 30F.

In the present embodiment, the total number of turns of the first layer 30F and the second layer 30G of the first winding portion 30A is approximately three, which is greater than the number of turns of the first winding portion 30A of the first embodiment. According to the present embodiment, it is thus possible to increase the magnetomotive force produced by the coil 30 to allow the main pole 24 to produce a write magnetic field of greater magnitude.

The remainder of configuration, function and effects of the present embodiment are similar to those of the first embodiment.

Fourth Embodiment

Figure 15:
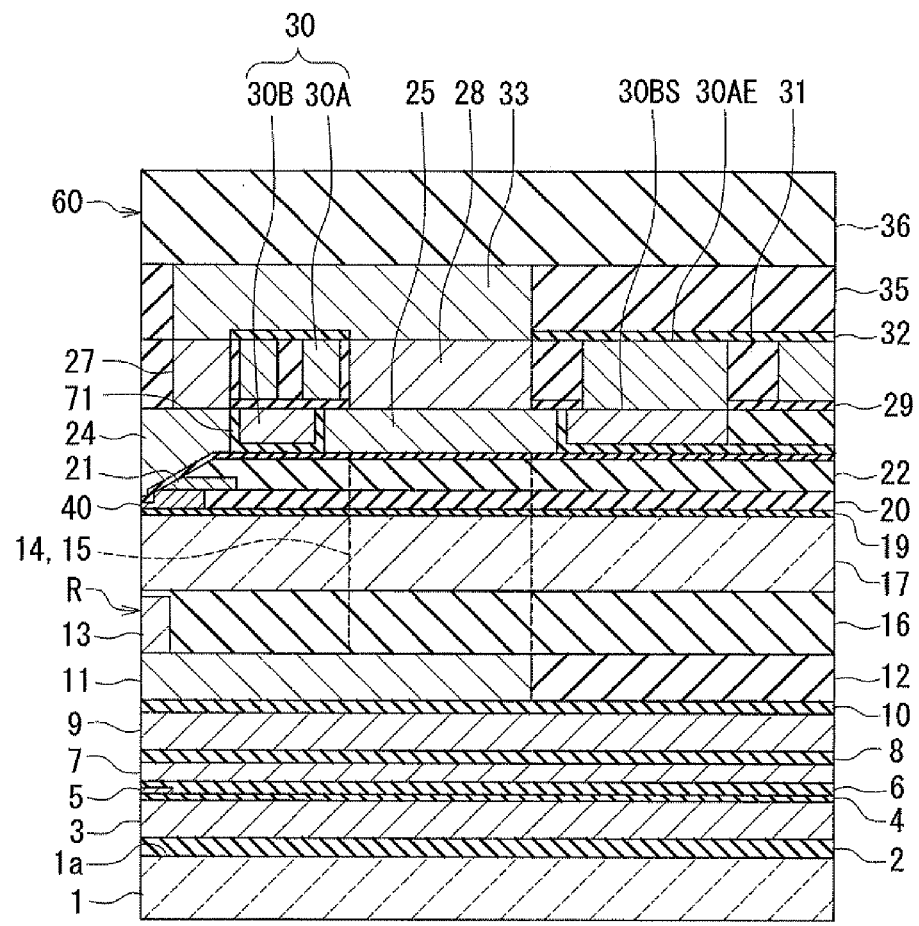
FIG. 15 is a cross-sectional view showing the configuration of a thermally-assisted magnetic recording head according to a fourth embodiment of the invention.
Figure 16:
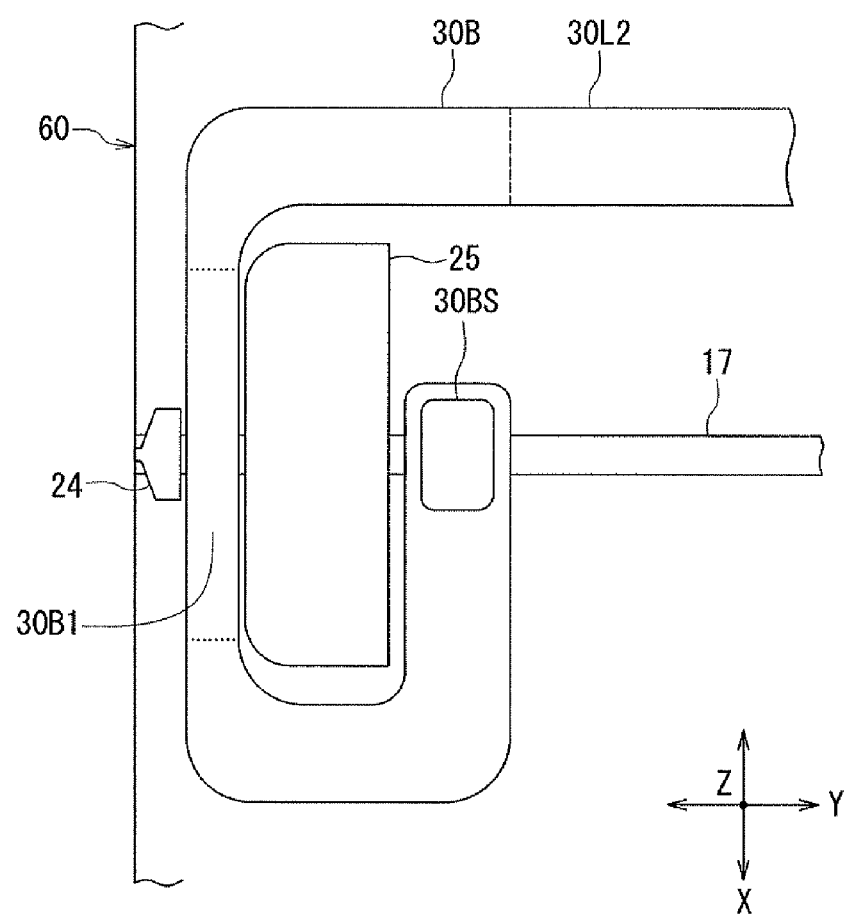
FIG. 16 is a plan view showing a second winding portion of a coil of the fourth embodiment of the invention.

A thermally-assisted magnetic recording head according to a fourth embodiment of the invention will now be described with reference to FIG. 15 and FIG. 16. FIG. 15 is a cross-sectional view showing the configuration of the thermally-assisted magnetic recording head. FIG. 16 is a plan view showing a second winding portion of the coil.

The configuration of the thermally-assisted magnetic recording head according to the present embodiment is different from that of the head according to the first embodiment as follows. In the thermally-assisted magnetic recording head according to the present embodiment, the coil 30 includes the second winding portion 30B and the lead portion 30L2 mentioned in the description of the second embodiment, in addition to the first winding portion 30A and the lead portion 30L1 mentioned in the description of the first embodiment. The coil connection part 30AE of the first winding portion 30A penetrates the insulating layer 29 and is electrically connected to the coil connection part 30BS of the second winding portion 30B. In the present embodiment, as shown in FIG. 16, the linear conductor portion 30B1 of the second winding portion 30B has a greater width in the direction perpendicular to the medium facing surface 60 (the Y direction) as compared with the example in the second embodiment shown in FIG. 10.

Further, the thermally-assisted magnetic recording head according to the present embodiment includes the insulating film 71 mentioned in the description of the second embodiment. The lead layer 34 is not provided in the present embodiment.

In the present embodiment, the total number of turns of the first winding portion 30A and the second winding portion 30B is approximately three, which is greater than the number of turns of the first winding portion 30A of the first embodiment. According to the present embodiment, it is thus possible to increase the magnetomotive force produced by the coil 30 to allow the main pole 24 to produce a write magnetic field of greater magnitude.

The remainder of configuration, function and effects of the present embodiment are similar to those of the first or second embodiment.

Fifth Embodiment

Figure 17:
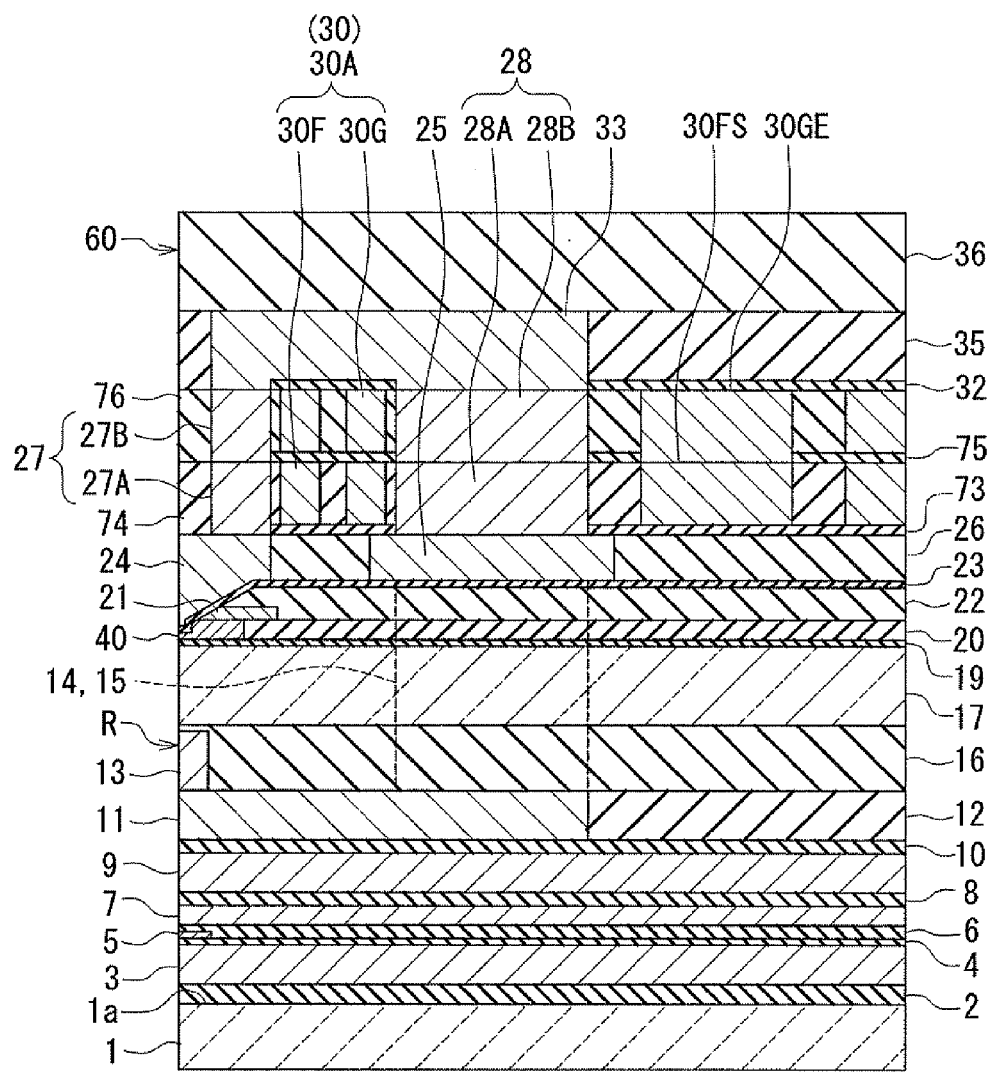
FIG. 17 is a cross-sectional view showing the configuration of a thermally-assisted magnetic recording head according to a fifth embodiment of the invention.
Figure 18:
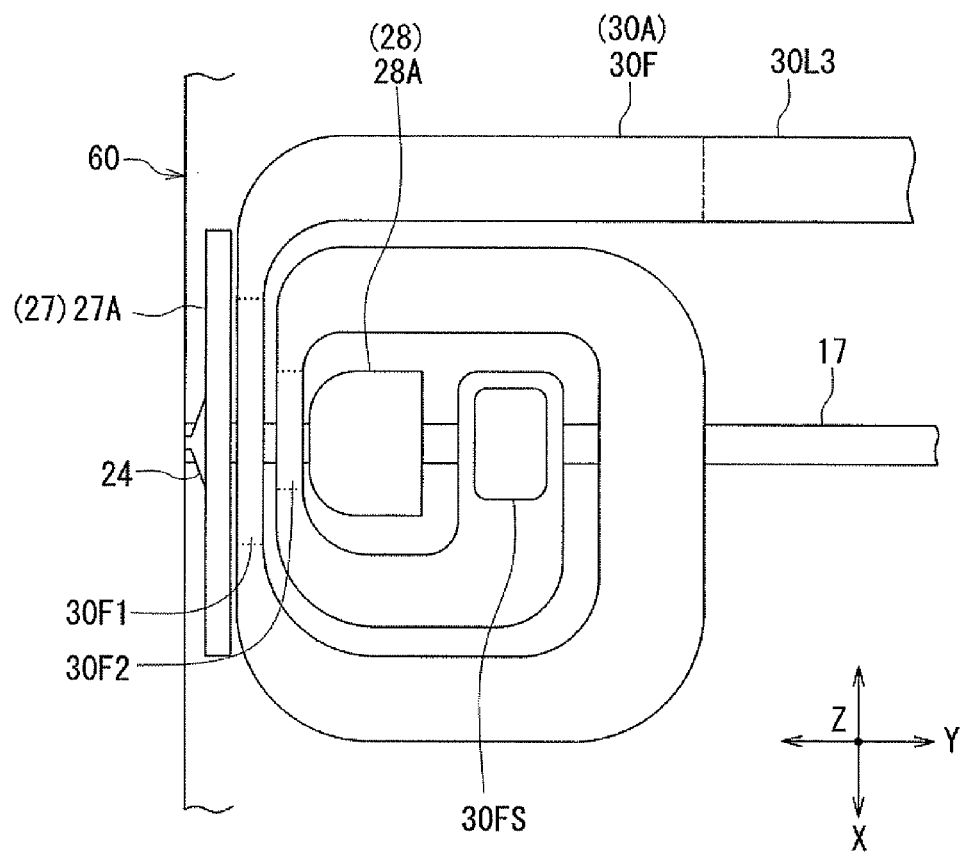
FIG. 18 is a plan view showing a first layer of a first winding portion of a coil of the fifth embodiment of the invention.

A thermally-assisted magnetic recording head according to a fifth embodiment of the invention will now be described with reference to FIG. 17 and FIG. 18. FIG. 17 is a cross-sectional view showing the configuration of the thermally-assisted magnetic recording head. FIG. 18 is a plan view showing a first layer of a first winding portion of the coil.

The configuration of the thermally-assisted magnetic recording head according to the present embodiment is different from that of the head according to the third embodiment as follows. In the thermally-assisted magnetic recording head according to the present embodiment, the first layer 30F of the first winding portion 30A of the coil 30 is wound approximately two turns around the first layer 28A of the third columnar portion 28. Further, as shown in FIG. 18, the first layer 30F includes a linear conductor portion 30F2 in addition to the linear conductor portion 30F1 mentioned in the description of the third embodiment. The linear conductor portion 30F2 is interposed between the first layer 28A and the medium facing surface 60 and extends linearly in parallel to the medium facing surface 60. The linear conductor portions 30F1 and 30F2 are interposed between the first layer 28A and the medium facing surface 60 and aligned in this order in the direction perpendicular to the medium facing surface 60, the linear conductor portion 30F1 being closer to the medium facing surface 60. Each of the linear conductor portions 30F1 and 30F2 has a constant width in the direction perpendicular to the medium facing surface 60 (the Y direction).

The remainder of configuration, function and effects of the present embodiment are similar to those of the third embodiment.

Sixth Embodiment

Figure 19:
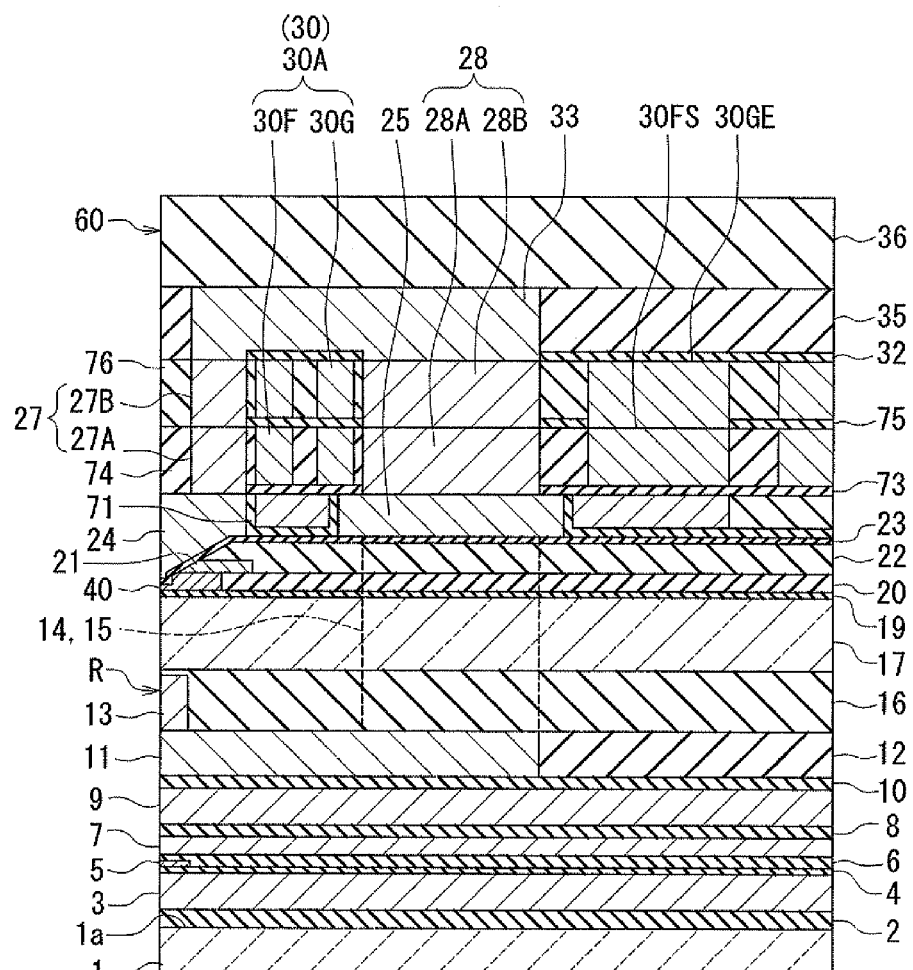
FIG. 19 is a cross-sectional view showing the configuration of a thermally-assisted magnetic recording head according to a sixth embodiment of the invention.
Figure 20:
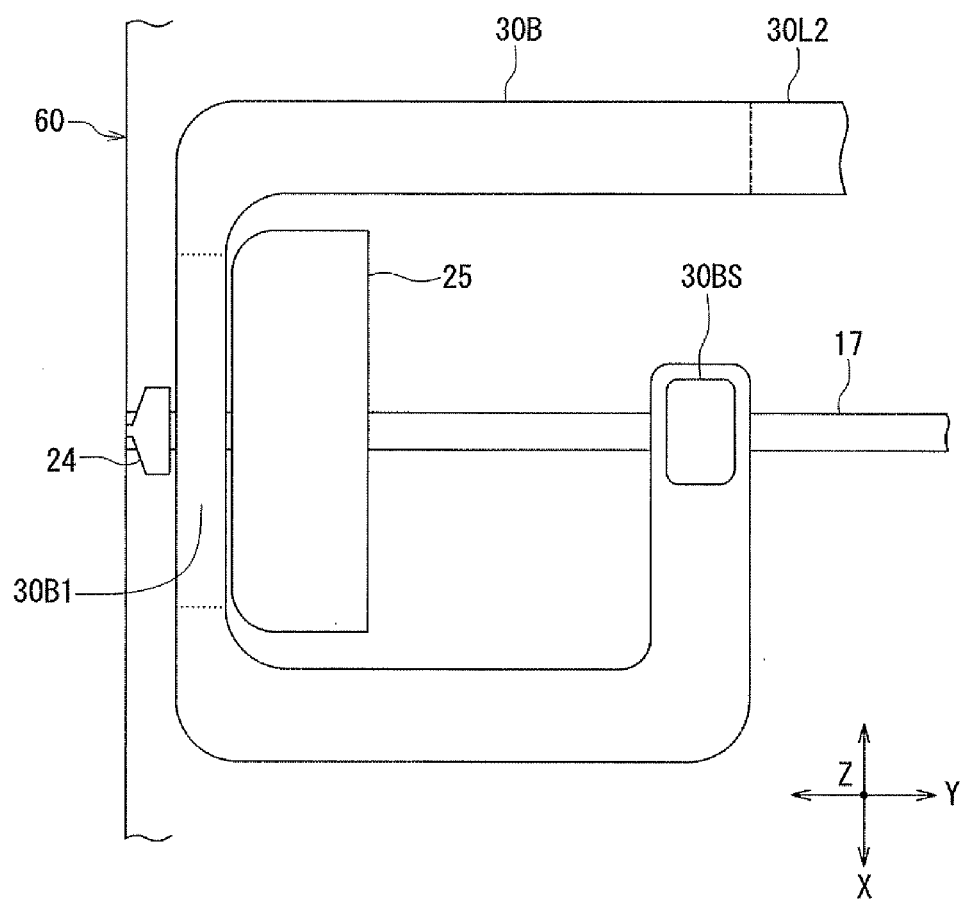
FIG. 20 is a plan view showing a second winding portion of a coil of the sixth embodiment of the invention.
Figure 21:
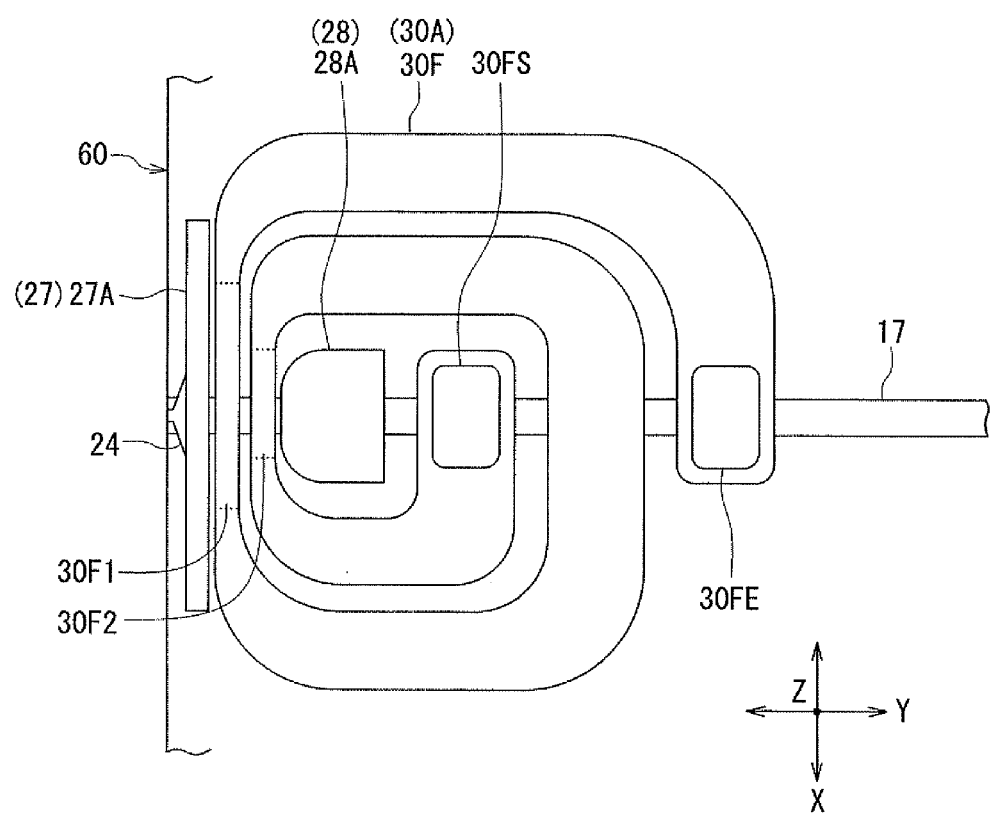
FIG. 21 is a plan view showing a first layer of a first winding portion of the coil of the sixth embodiment of the invention.

A thermally-assisted magnetic recording head according to a sixth embodiment of the invention will now be described with reference to FIG. 19 to FIG. 21. FIG. 19 is a cross-sectional view showing the configuration of the thermally-assisted magnetic recording head. FIG. 20 is a plan view showing a second winding portion of the coil. FIG. 21 is a plan view showing a first layer of a first winding portion of the coil.

The configuration of the thermally-assisted magnetic recording head according to the present embodiment is different from that of the head according to the fifth embodiment as follows. In the thermally-assisted magnetic recording head according to the present embodiment, the coil 30 includes the second winding portion 30B and the lead portion 30L2 mentioned in the description of the fourth embodiment, in addition to the first winding portion 30A. Further, of the lead portions 30L3 and 30L4 mentioned in the description of the fifth embodiment (the third embodiment), only the lead portion 30L4 is provided in the coil 30 of the present embodiment. The first layer 30F of the first winding portion 30A has a coil connection part 30FE electrically connected to the coil connection part 30BS of the second winding portion 30B, in addition to the coil connection part 30FS electrically connected to the coil connection part 30GE of the second layer 30G. As viewed from above, the first layer 30F is wound in a clockwise direction from the coil connection part 30FS toward the coil connection part 30FE.

The thermally-assisted magnetic recording head according to the present embodiment further includes the insulating film 71 mentioned in the description of the fourth embodiment (the second embodiment). The coil connection part 30FE of the first layer 30F penetrates the insulating film 71 and is electrically connected to the coil connection part 30BS of the second winding portion 30B. In the present embodiment, as shown in FIG. 20, the location of the coil connection part 30BS of the second winding portion 30B is different from that in the example in the fourth embodiment shown in FIG. 16.

The remainder of configuration, function and effects of the present embodiment are similar to those of the fourth or fifth embodiment.

Seventh Embodiment

Figure 22:
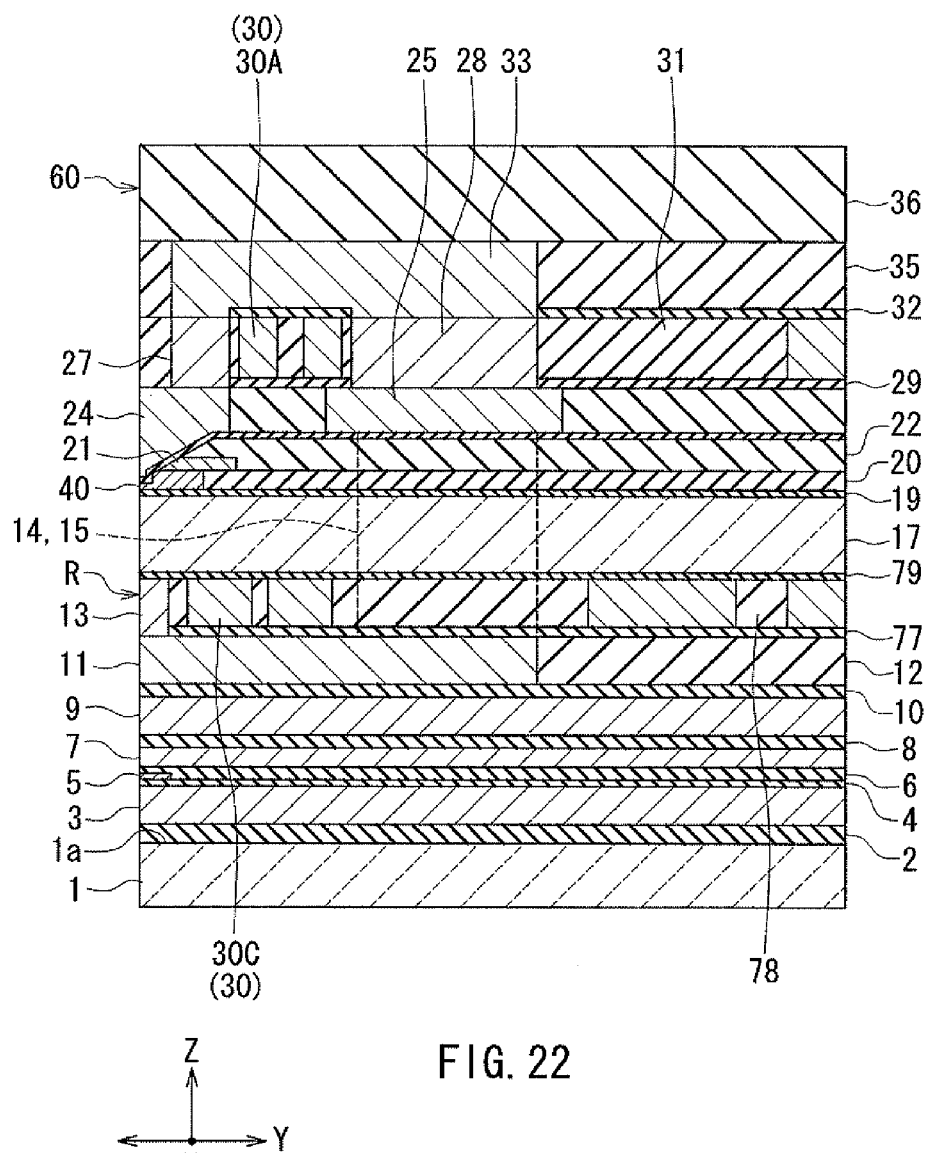
FIG. 22 is a cross-sectional view showing the configuration of a thermally-assisted magnetic recording head according to a seventh embodiment of the invention.
Figure 23:
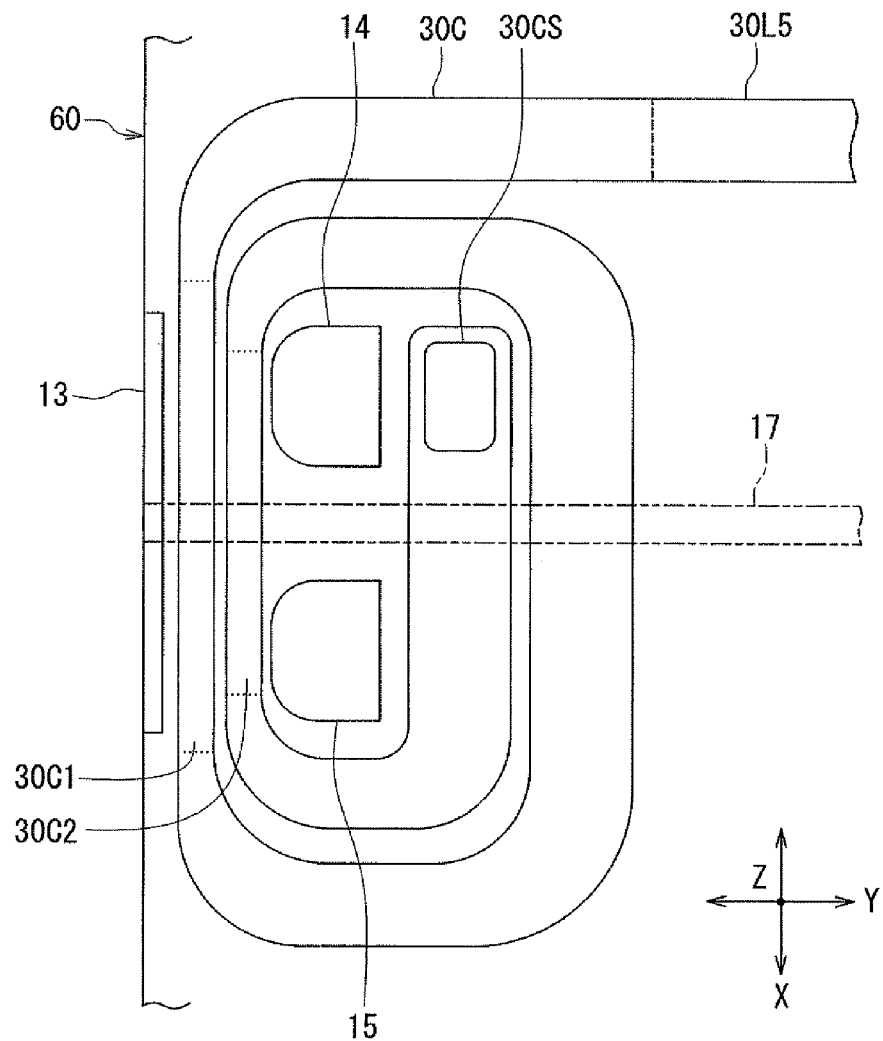
FIG. 23 is a plan view showing a third winding portion of a coil of the seventh embodiment of the invention.
Figure 24:
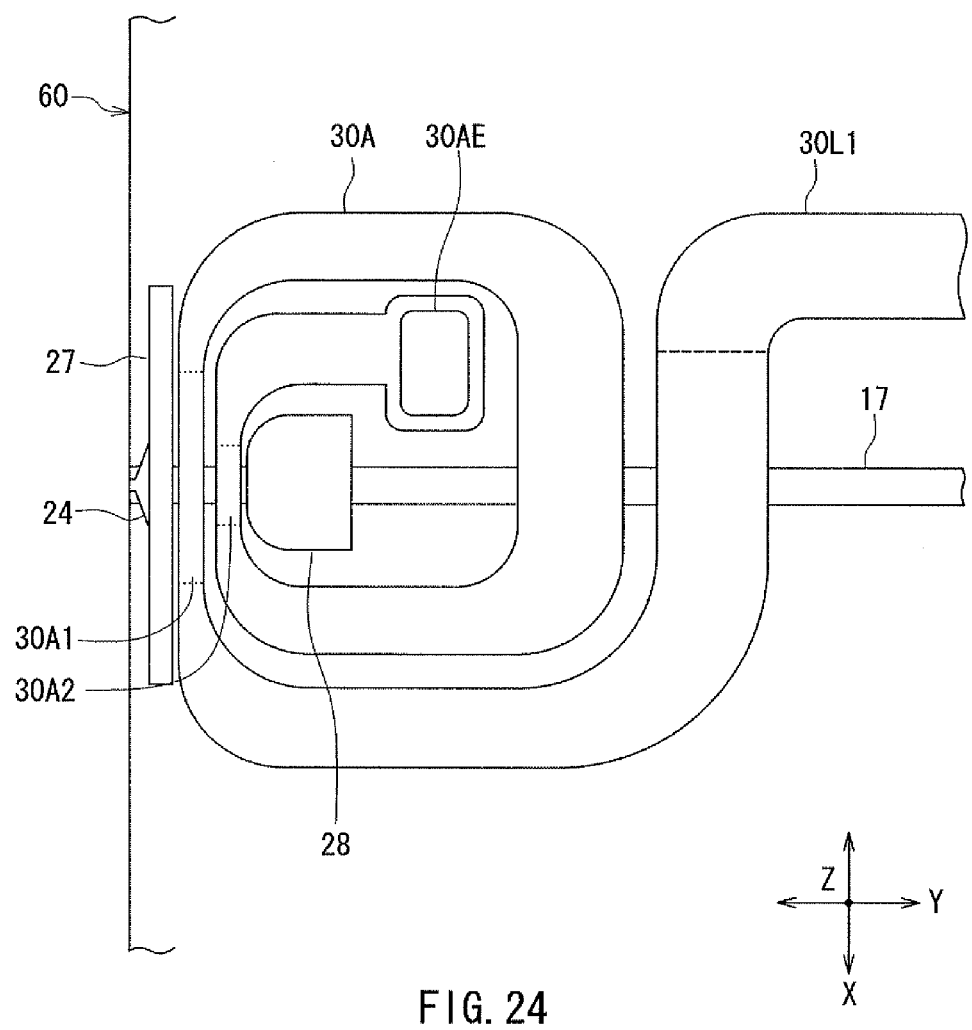
FIG. 24 is a plan view showing a first winding portion of the coil of the seventh embodiment of the invention.

A thermally-assisted magnetic recording head according to a seventh embodiment of the invention will now be described with reference to FIG. 22 to FIG. 24. FIG. 22 is a cross-sectional view showing the configuration of the thermally-assisted magnetic recording head. FIG. 23 is a plan view showing a third winding portion of the coil. FIG. 24 is a plan view showing a first winding portion of the coil.

The configuration of the thermally-assisted magnetic recording head according to the present embodiment is different from that of the head according to the first embodiment as follows. In the thermally-assisted magnetic recording head according to the present embodiment, the coil 30 includes a third winding portion 30C and a lead portion 30L5, in addition to the first winding portion 30A and the lead portion 30L1. The third winding portion 30C is wound around the first and second columnar portions 14 and 15 and connected to the first winding portion 30A. The lead portion 30L5 is contiguous with the third winding portion 30C. The third winding portion 30C and the lead portion 30L5 are located on the rear side in the direction of travel of the recording medium (the Z direction) relative to the core 17. In FIG. 23 the boundary between the third winding portion 30C and the lead portion 30L5 is shown by a broken line. As shown in FIG. 23, the third winding portion 30C is wound approximately two turns around the first and second columnar portions 14 and 15.

Further, as shown in FIG. 23, the third winding portion 30C has a coil connection part 30CS electrically connected to the coil connection part 30AE of the first winding portion 30A, and two linear conductor portions 30C1 and 30C2 located between the medium facing surface 60 and the first and second columnar portions 14 and 15. The linear conductor portions 30C1 and 30C2 are aligned in this order in the direction perpendicular to the medium facing surface 60, the linear conductor portion 30C1 being closer to the medium facing surface 60. Each of the linear conductor portions 30C1 and 30C2 has a constant width in the direction perpendicular to the medium facing surface 60 (the Y direction). As viewed from above, the third winding portion 30C is wound in a clockwise direction from the coil connection part 30CS toward the boundary between the third winding portion 30C and the lead portion 30L5.

In the present embodiment, the coil connection part 30AE of the first winding portion 30A is electrically connected to the coil connection part 30CS of the third winding portion 30C via a columnar connection layer (not shown) penetrating a plurality of layers interposed between the first winding portion 30A and the third winding portion 30C. The connection layer is made of a conductive material such as copper. In the present embodiment, as shown in FIG. 24, the location of the coil connection part 30AE of the first winding portion 30A is different from that in the example in the first embodiment shown in FIG. 5. Specifically, the coil connection part 30AE is located to avoid the region immediately above the core 17. Further, the lead layer 34 is not provided in the present embodiment.

The thermally-assisted magnetic recording head according to the present embodiment further includes insulating layers 77 and 78. The insulating layer 77 is disposed on part of the top surface of the yoke layer 11 and the top surface of the insulating layer 12 and surrounds the shield layer 13. The third winding portion 30C and the lead portion 30L5 are disposed on the insulating layer 77. The insulating layer 78 is disposed around the shield layer 13, the third winding portion 30C and the lead portion 30L5 and in the space between adjacent turns of the third winding portion 30C. The top surfaces of the shield layer 13, the third winding portion 30C, the lead portion 30L5 and the insulating layer 78 are even with each other. The insulating layers 77 and 78 are made of alumina, for example.

Further, in the present embodiment, the cladding of the waveguide includes a cladding layer 79 in place of the cladding layer 16. The cladding layer 79 is disposed over the shield layer 13, the third winding portion 30C, the lead portion 30L5 and the insulating layer 78. The core 17 and the cladding layer 18 (see FIG. 4) are disposed on the cladding layer 79. The cladding layer 79 is made of the same material as the cladding layers 18 and 19 mentioned in the description of the first embodiment.

In the present embodiment, the total number of turns of the first winding portion 30A and the third winding portion 30C is approximately four, which is greater than the number of turns of the first winding portion 30A of the first embodiment. According to the present embodiment, it is thus possible to increase the magnetomotive force produced by the coil 30 to allow the main pole 24 to produce a write magnetic field of greater magnitude.

The remainder of configuration, function and effects of the present embodiment are similar to those of the first embodiment.

The present invention is not limited to the foregoing embodiments, and various modifications may be made thereto. For example, as far as the requirements of the appended claims are met, the shapes and locations of the coil, the core of the waveguide, the plasmon generator, and the main pole can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:

a medium facing surface that faces a recording medium;

a coil that produces a magnetic field corresponding to data to be written on the recording medium;

a main pole having a first end face located in the medium facing surface, the main pole allowing a magnetic flux that corresponds to the magnetic field produced by the coil to pass, and producing a write magnetic field for writing the data on the recording medium;

a return path section made of a magnetic material and having a second end face located in the medium facing surface, the return path section being connected to the main pole so that a space through which part of the coil passes is defined by the main pole and the return path section;

a waveguide including a core through which light propagates, and a cladding provided around the core; and a plasmon generator having a near-field light generating part located in the medium facing surface, wherein:

the first end face and the second end face are located at positions that are different from each other in a direction of travel of the recording medium;

the near-field light generating part is located between the first end face and the second end face;

the plasmon generator is configured so that a surface plasmon is excited on the plasmon generator based on the light propagating through the core, and the near-field light generating part generates near-field light based on the surface plasmon;

the return path section includes: first and second columnar portions that are located on opposite sides of the core in a track width direction and are each spaced from the core; a coupling portion coupling the first and second columnar portions to each other; and a third columnar portion connected to the coupling portion;

the third columnar portion is located such that the coupling portion is interposed between the third columnar portion and the core;

the third columnar portion is smaller than the coupling portion in width in the track width direction; and the coil includes a first winding portion wound around the third columnar portion.

2. The thermally-assisted magnetic recording head according to claim 1, wherein:

the core has an evanescent light generating surface that generates evanescent light based on the light propagating through the core;

the plasmon generator has a plasmon exciting part that is opposed to the evanescent light generating surface with a predetermined spacing therebetween; and in the plasmon generator, the surface plasmon is excited on the plasmon exciting part through coupling with the evanescent light generated by the evanescent light generating surface, the surface plasmon propagates to the near-field light generating part, and the near-field light generating part generates the near-field light based on the surface plasmon.

3. The thermally-assisted magnetic recording head according to claim 1, wherein the main pole, the coupling portion and the third columnar portion are located on the same side relative to the core in the direction of travel of the recording medium.

4. The thermally-assisted magnetic recording head according to claim 3, wherein:

the return path section further includes a yoke layer located opposite from the main pole, the coupling portion and the third columnar portion with the core interposed therebetween; and the first and second columnar portions couple the coupling portion and the yoke layer to each other.

5. The thermally-assisted magnetic recording head according to claim 1, wherein the coil further includes a second winding portion wound around the coupling portion and connected to the first winding portion.

* * * * *